(12) United States Patent
Heeringa

(10) Patent No.: US 12,134,458 B2
(45) Date of Patent: Nov. 5, 2024

(54) SYSTEM, APPARATUS, AND METHOD OF MANUFACTURE FOR A RIB STRUCTURE

(71) Applicant: TEXTRON INNOVATIONS INC., Providence, RI (US)

(72) Inventor: Tjepke Heeringa, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 87 days.

(21) Appl. No.: 17/866,753

(22) Filed: Jul. 18, 2022

(65) Prior Publication Data
US 2024/0017812 A1 Jan. 18, 2024

(51) Int. Cl.
| | |
|---|---|
| *B64C 1/06* | (2006.01) |
| *B21D 13/10* | (2006.01) |
| *B21D 53/92* | (2006.01) |
| *B32B 3/28* | (2006.01) |
| *B32B 7/05* | (2019.01) |
| *B32B 15/01* | (2006.01) |
| *B64F 5/10* | (2017.01) |

(52) U.S. Cl.
CPC .............. *B64C 1/065* (2013.01); *B21D 13/10* (2013.01); *B21D 53/92* (2013.01); *B32B 3/28* (2013.01); *B32B 7/05* (2019.01); *B32B 15/01* (2013.01); *B64F 5/10* (2017.01); *B32B 2250/02* (2013.01); *B32B 2605/18* (2013.01)

(58) Field of Classification Search
CPC ... B64C 1/065; B64F 5/10; B32B 7/05; B32B 3/28; B32B 15/01; B32B 2250/02; B32B 2605/18; B21D 53/92; B21D 13/10
See application file for complete search history.

(56) References Cited

U.S. PATENT DOCUMENTS

| | | | | |
|---|---|---|---|---|
| 7,509,740 | B2 * | 3/2009 | Munk | B64F 5/10 29/559 |
| 7,802,754 | B2 | 9/2010 | Karem | |
| 8,517,309 | B2 | 8/2013 | Robinson | |
| 9,550,347 | B2 | 1/2017 | Kendrick et al. | |
| 10,457,378 | B2 * | 10/2019 | Kooiman | B64C 3/18 |
| 10,513,324 | B2 | 12/2019 | Carlson et al. | |
| 2007/0023573 | A1 * | 2/2007 | Neale | B64C 3/187 244/124 |
| 2010/0270435 | A1 | 10/2010 | Karem | |
| 2011/0147522 | A1 * | 6/2011 | Williams | B64F 5/10 244/123.1 |
| 2016/0297511 | A1 * | 10/2016 | Barakatain | B64U 20/70 |

(Continued)

*Primary Examiner* — Tye William Abell
(74) *Attorney, Agent, or Firm* — Akona IP PC

(57) ABSTRACT

One embodiment includes a rib structure to be used, for example, in any number of aerospace applications, the rib structure, comprising a first piece having a first curvature in a first plane; and a second piece having a second curvature in a second plane that is different from the first plane. The first piece and the second piece are bonded together to form the rib structure. In certain embodiments, the first piece further comprises a plurality of discontinuous flanges to interface with a plurality of skin surfaces. In other examples, the first piece includes an aft spar interface for bonding to a surface. In some implementations, the first piece includes a forward spar interface for bonding to a surface. Manufacturing of the airframe/aircraft parts, panels, and rib components can include any suitable composites, alloys, titanium, aluminum, artificial materials, sheet metal, etc.

20 Claims, 23 Drawing Sheets

(56) References Cited

U.S. PATENT DOCUMENTS

2017/0225770 A1\* 8/2017 Kooiman .................. B64F 5/10
2021/0237845 A1   8/2021 Heeringa
2021/0371130 A1\* 12/2021 Borowicz ............. B29C 70/342
2023/0182408 A1\*  6/2023 Rolfes ....................... B32B 7/14
                                                          428/98

\* cited by examiner

SYSTEM, APPARATUS, AND METHOD OF MANUFACTURE FOR A RIB STRUCTURE

TECHNICAL FIELD

This disclosure relates generally to rib structures and, more particularly, though not exclusively, to a system, an apparatus, and a method of manufacture for a rib structure.

BACKGROUND

The successful development of aircrafts in the last 50 years have made rotor configurations viable for both military and commercial uses. Such aircraft can readily use the lift of rotors to hover, maneuver, and perform Vertical Take-Off and Landing (VTOL) operations. During flight, the lift can be provided by the wings and the forward thrust by the rotors.

The efficiency of any aircraft is critical to its viability and its adoption. For example, efficiency could be suitably assessed by measuring an aircraft's payload carried times the distance traveled per-consumed fuel. Other worthwhile metrics can include the ratio between lift and drag of an aircraft.

The ability of an aircraft to achieve top speed, to maneuver effectively, and to be responsive is highly dependent on its weight metrics. An aircraft's performance ratios are universally limited by materials, weight, and structural dynamics. Hence, premium considerations in designing aircraft, including rotary aircraft, fixed-wing aircraft, and aerospace vehicles, boats, satellites, ships include both weight and structural integrity considerations, along with factoring in costs, complexity, ease of manufacturing and assembly, etc. These considerations often require some design tradeoff, as some design choices that increase structural integrity also increase weight, and some design choices that decrease weight decrease structural integrity.

DETAILED DESCRIPTION

Considerations for Aircraft Designs

Figure 1A:
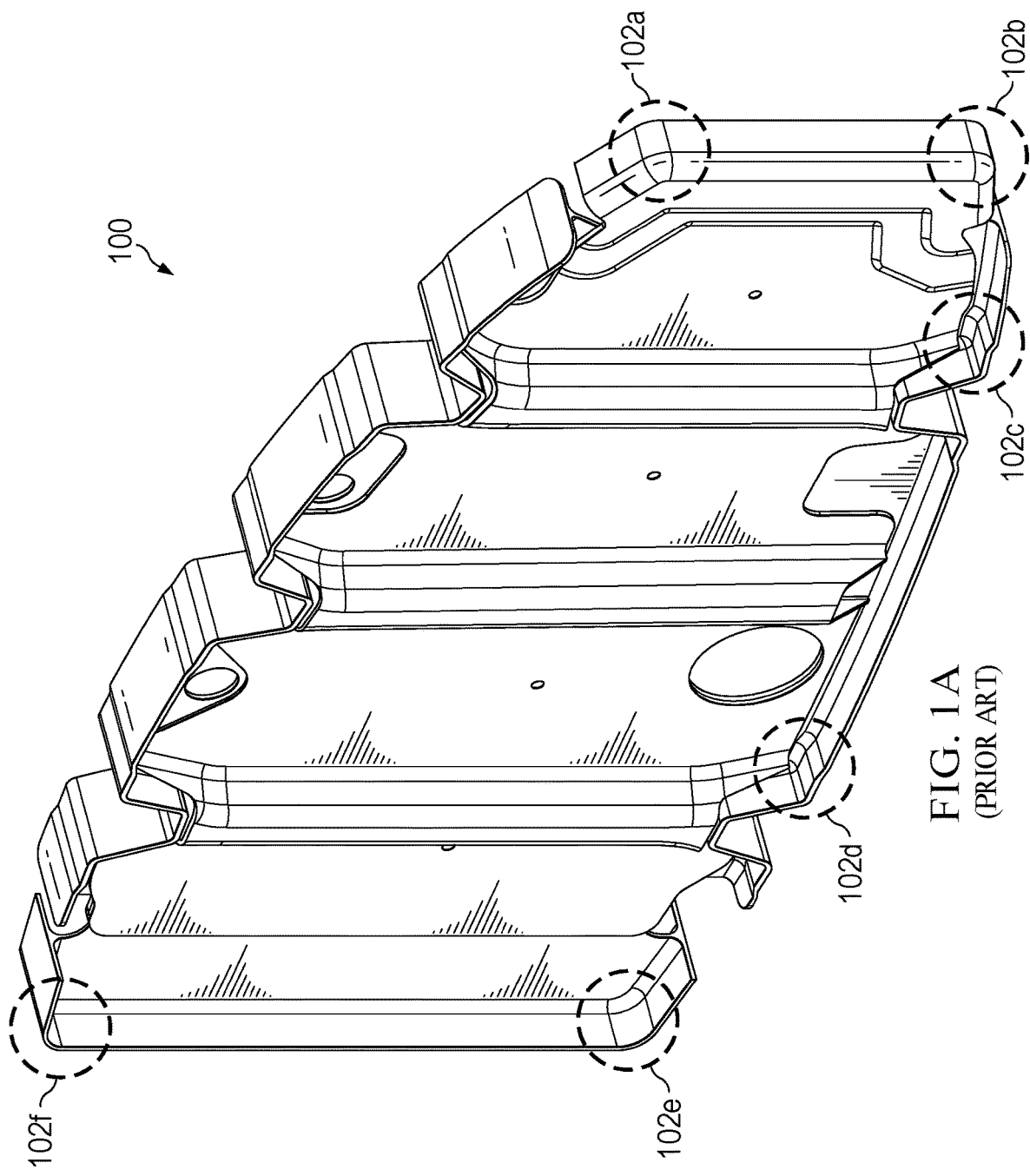
FIGS. 1A-1B are simplified schematic diagrams illustrating two views of an example structural member of Prior Art.

Among the many considerations that go into the manufacture of an airframe, such as material, composition, shape, corrosive characteristics, and many others, an aircraft designer must make trade-offs between desired features. For example, strength and stiffness are key features in manufacturing parts of an airframe/aircraft and, in particular, in manufacturing the inner grid or "skeleton" of the airframe. Strength and stiffness are important to provide rigidity and structural soundness for the airframe. However, weight is also an important consideration. The more an aircraft weighs, the more fuel is required to power it, the more expensive it is to operate, and the shorter its range. Thus, in the aeronautical sciences, much study has been devoted to airframe/aircraft designs that have good stiffness characteristics, while minimizing weight attributes.

For example, one method of manufacturing panels for use in aircraft includes starting with a block or sheet of material (e.g., a metallic block) with the appropriate length and width and with a desired thickness. As a solid slab, this panel may have good stiffness characteristics, but it may also be quite heavy. One method of reducing the weight is to reduce the thickness of the panel, but in this case the panel can be less stiff and more prone to buckling.

Another method of manufacture would be to selectively subtract material from the panel on one or both sides in a geometric pattern. This defines a series of "cells" and the total subtracted area may be thought of as a "field" with the edges of the sheet defining the extremities of the field. The interior edges of the geometric pattern can divide the large field into a series of smaller "pockets." The larger the size of an individual pocket, the more prone the pocket is to buckling. The smaller the size of the individual pocket, the less prone the pocket is to buckling, but the larger amount of wall material will increase the weight of the panel. It is therefore desirable to identify geometric patterns and shapes that provide the appropriate tradeoff between stiffness and weight (or overall material). The subtractive process for forming these geometric patterns and shapes within the metal panel is machining a single monolithic piece of metal. However, there are other methods of creating such a panel. For example, a panel could be three-dimensionally printed, injection molded, machined, etched, cast, or manufactured by some other suitable process.

In some cases, it may be desirable to stiffen a panel in such a way that the overall panel stiffness is isotropic, or in other words, the stiffness is relatively the same regardless of the load angle. Isotropic surfaces are common and the National Aeronautics and Space Administration (NASA) has provided a handbook known as the "Isogrid Design Handbook", which provides techniques for designing appropriate shapes and patterns, particularly for use in aerospace applications such as launch vehicles and spacecraft.

Advantageously, many of these manufacturing techniques can result in less parasitic material at the joints. Because machining complex geometric patterns is relatively difficult and expensive, in cases where the grids overlay each other on the same side, the complex geometric patterns and shapes may result in substantial parasitic material at the joints of the overlays. Putting different stiffener patterns on opposite sides of a rib structure reduces an effective pocket size, which increases the local buckling resistance of the interlocking web of stiffeners, but that also adds weight and possible curvatures to the overall assembly.

Rib Structures on Aircraft Designs

Figure 1B:
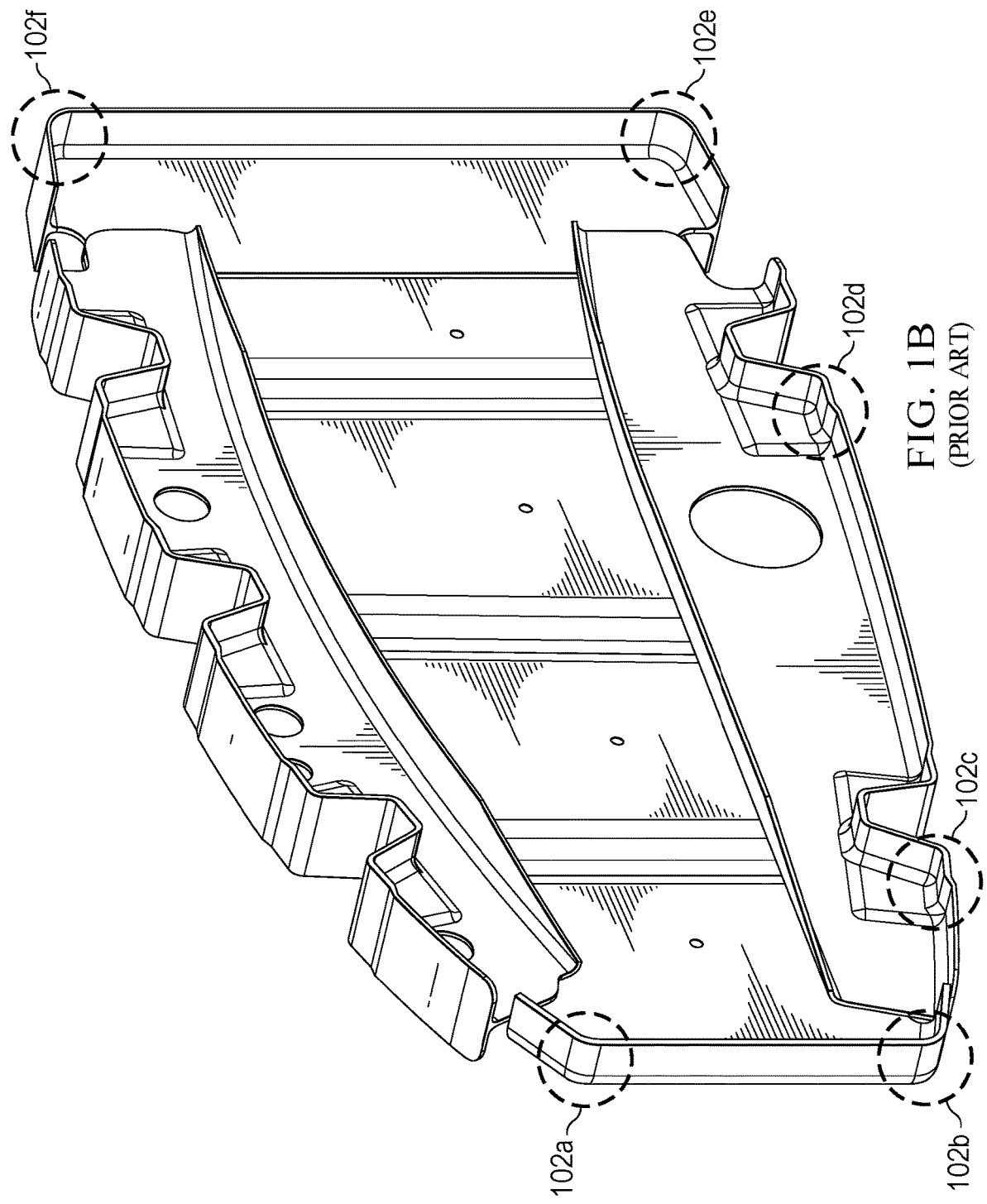

Turning to FIGS. 1A-1B for discussion purposes, these schematics illustrate two views of an example structural member of Prior Art. A composite wing rib is generally indicated at 100 in these illustrations. In addition, a number of compound curvatures are indicated at 102a-e. For sheet metal and composite parts, corrugated webs are an efficient way to increase load capability by increasing buckling resistance. However, adding stiffening geometry can significantly increase manufacturing complexity, especially for parts like aircraft ribs, which feature multiple instances of compound curvatures on the tool surface. In addition, decreasing the number of parts is universally desired in order to minimize assembly operations.

Figure 1C:
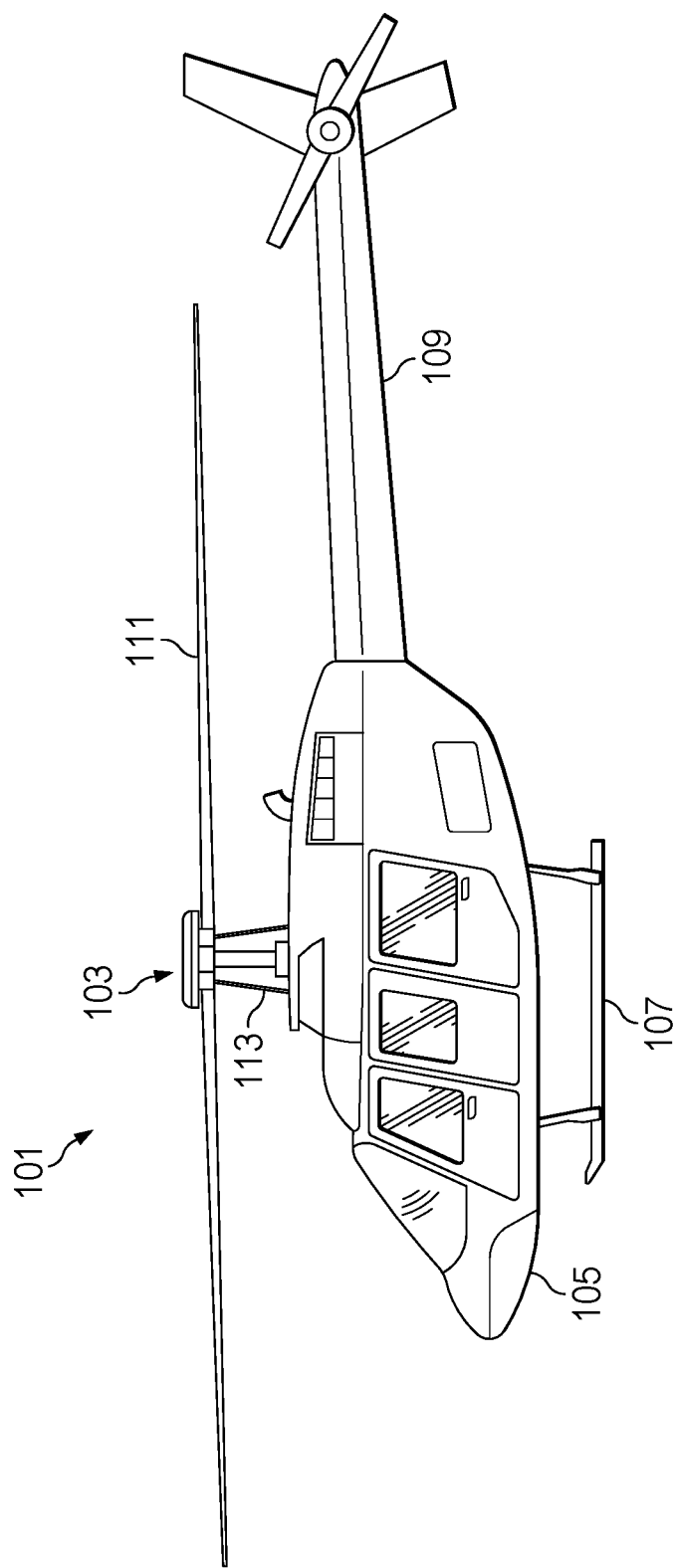
FIGS. 1C-1D and FIG. 2 are simplified schematic diagrams that collectively illustrate some of the many example aircrafts that could readily implement the teachings of the present Specification.
Figure 1D:
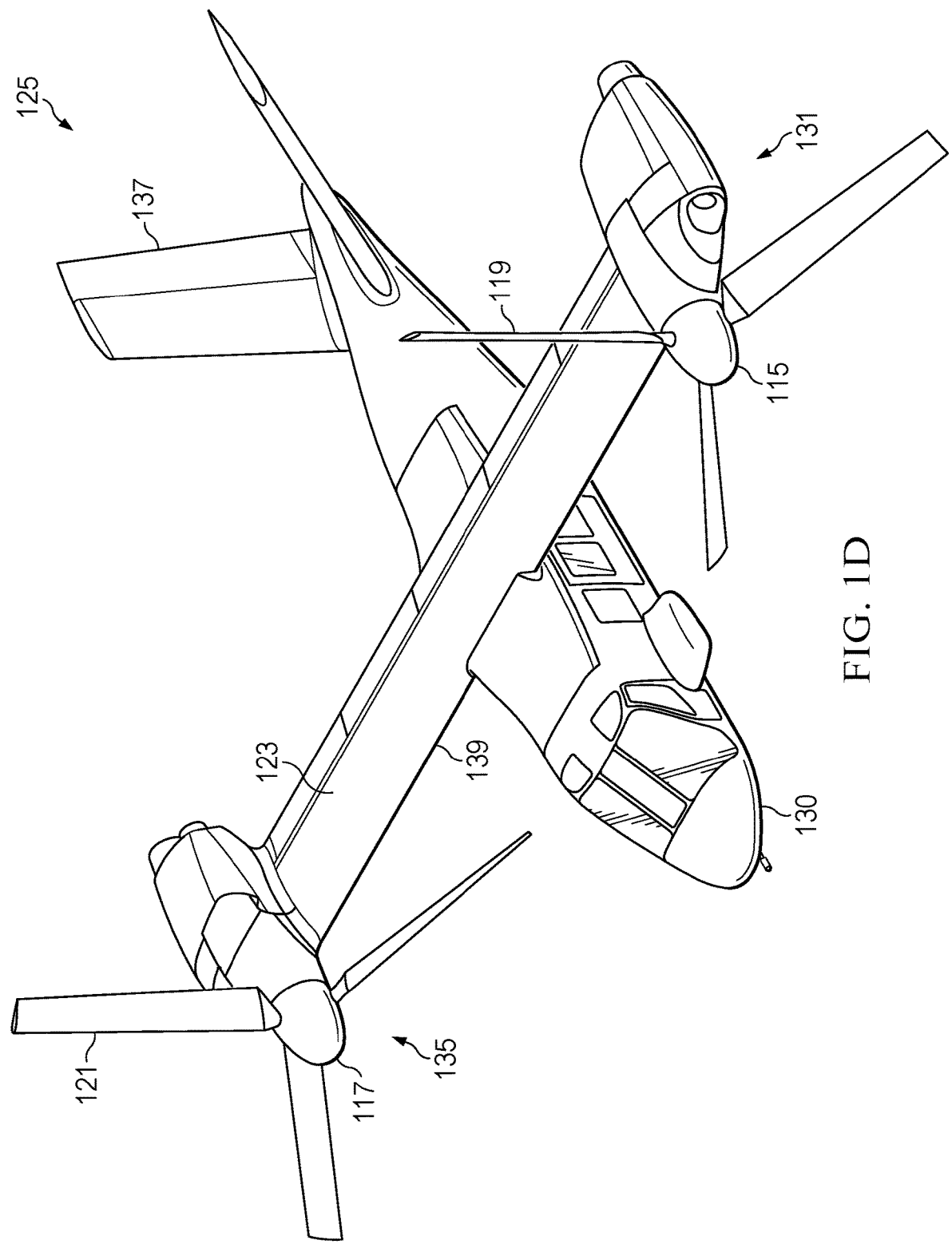
Figure 2:
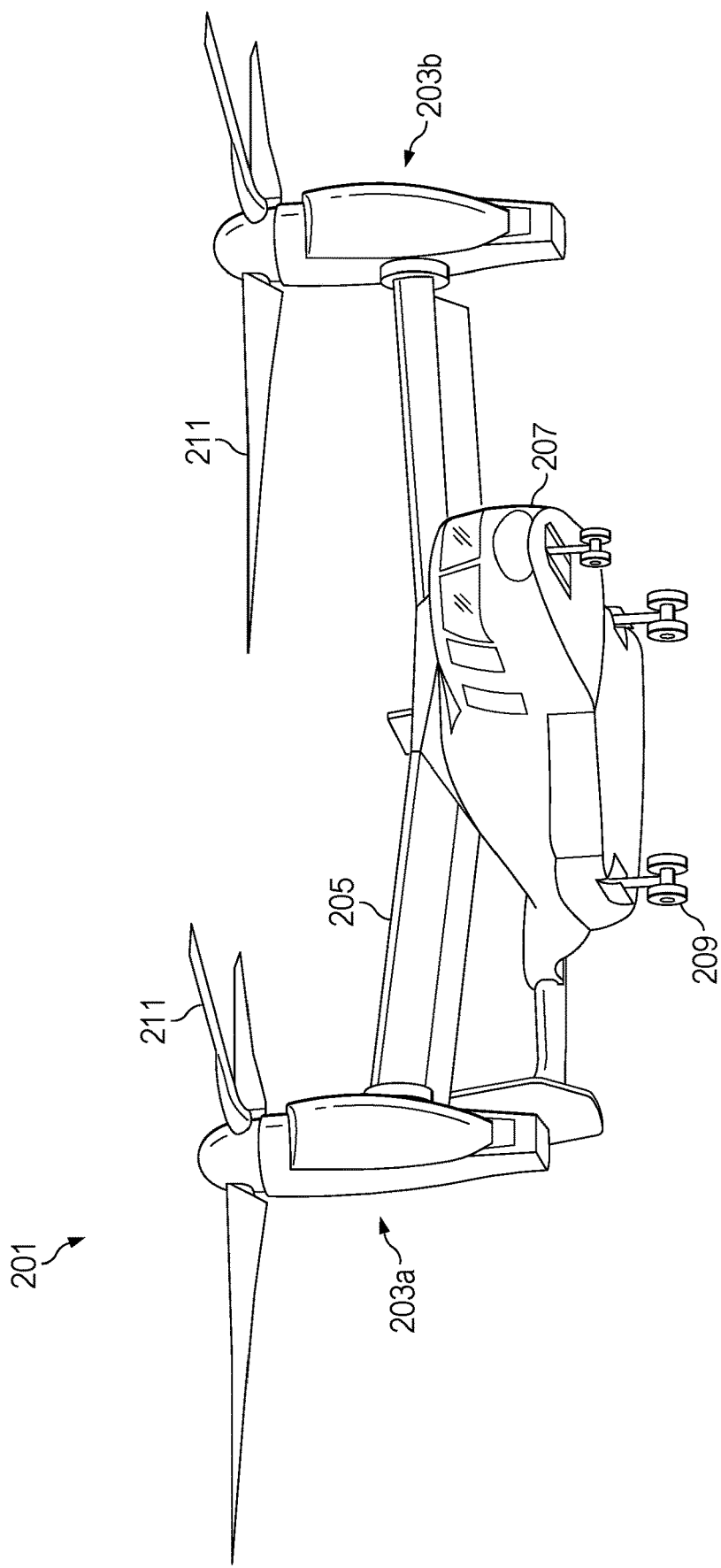

Referring now to FIGS. 1C-1D and FIG. 2, these depictions collectively illustrate some of the many example aircrafts that could readily implement the teachings of the present Specification, as detailed herein. Looking at a given wing on a rotor aircraft, the main structure of the wing can be looked at as a rectangular box. The wing ribs sit in this box and, further, they help to divide the structure. Typically, these are vertical pieces of structure that connect on a forward end and on an aft end. Often such pieces are made of composites or of sheet metal.

Their accompanying manufacturing process results in many unwanted corners, along with flanges that point in various directions. These corners should be compensated for in some intelligent manner during the manufacturing process. For example, a given corner can be cut out, or the corner can be alternately folded in one direction and then a second piece in a second direction. As is to be expected, these manufacturing processes can be labor intensive.

It should also be noted that the webs of these composite materials are often prone to buckling. Essentially, a given structure would be vulnerable to the weight-bearing nature of the stress or to the load being placed on it and, hence, too much stress results in a deforming, wavy, undesirable component. In a worst case scenario, such structures may ultimately fail during use. One way in which to prevent such undesirable effects is to provide a corrugated stiffening piece behind the composite. This effectively resolves the buckling effect; however, it also adds a corrugated piece into the architecture. This change further introduces additional corners that should be accounted for during the manufacturing process.

Overview

Example embodiments of the present Specification effectively decrease manufacturing complexity by implementing a number of single part and multi-part corrugated rib designs. Additionally, certain embodiments of the present disclosure can make rib caps discontinuous such that the geometry of the assembly part is simplified, while the part count is reduced. Hence, a manufacturing process and a resulting composite stiffened rib can be provided to eliminate many of the aforementioned problems associated with complexity, buckling, and a reduction in tolerance buildup. Systematically, such rib designs would effectively reduce the number of parts required to formulate many aircraft assembly structures.

For a two-part design implementation, it should be noted that it is challenging to make and coordinate any parts that include a type of curvature. For two-part assembly systems, one objective is to manufacture two parts that could share a substantially similar curvature. In one example embodiment, the corrugated pieces described herein would only be curved in a single plane. Its counterpart (shown in various FIGURES and discussed below) would be curved in another plane. By separating these two pieces, the manufacturing process would be simplified. Hence, as these two pieces are bonded together, there are four effective interfaces that are structurally sound for a given wing box for which these parts can be designed.

In another example embodiment, tooled surfaces can be used in which the specific composite part interfaces with the wing and the spars to minimize assembly tolerance buildup. Typically, there is a first wing surface and a second wing surface, for which at least one of the accompanying surfaces is considered to be a hard surface to lay the composite upon. Hence, a designer can lay the composite material on the hard surface and position a bag on the other surface and by using a vacuum, compression techniques are implemented to allow for an effective curing of these structures under heat. One side of the composite part would be smooth, as is desired, and this surface would most resemble what was originally theorized and drawn (e.g., using Computer Aided Design (CAD) or a similar program). Hence, this side of the composite part would have the fewest tolerance deviations on it, while the other side would not be as ideal from a specifications perspective. If a designer chooses the tooling correctly, then the interfaces within the part (and to other parts) would be properly tooled and effectively controlled. This allows the resultant part to be readily fit into its intended location within a broader wing or aircraft architecture.

In certain example implementations, the two parts can be made of the same material. However, alternative embodiments can include any type of composite material being used for each of these parts. For example, sheet metal could easily be used in various embodiments. Metals will have the same formation challenges in trying to shape and bend configurations, while being able to maintain strength for the rib itself. The manufacturing of the rib would consistently be easier to bend in one single direction. Furthermore, composite and sheet metals are discussed herein as an illustrative example of a popular material for manufacturing the airframe/aircraft parts, panels, and rib components, but this should also be understood to be nonlimiting. Composites, alloys, titanium, aluminum, artificial materials, and others could be readily used in similar processes for the example implementations discussed throughout this Specification.

Non-Limiting Nature of Example Architectures and Specifications

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, as referred to herein in this Specification, the terms "forward", "aft", "inboard", and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage—of an aircraft and/or a special direction that farther from the centerline of the aircraft relative to another component or component aspect(s).

Still further, the present disclosure may repeat reference numerals and/or letters in the countless examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Example Aircraft for Implementing Example Embodiments

FIG. 1C illustrates an example embodiment of a rotorcraft 101. The aircraft illustrated in this embodiment may benefit from improved rib structures, such as in the airframe/aircraft, in wing assemblies, in fuselage, etc., as detailed herein. This can provide improved stiffness, while also reducing weight. For example, the rib structures and stiffening elements discussed in this Specification could be used in building at least portions of the skeleton of the airframe of the illustrated aircraft. The reduced weight may result in greater fuel efficiency, greater maneuverability, and other benefits, while the increased stiffness provides greater airframe/aircraft integrity.

The illustrated example portrays a side view of rotorcraft 101. Rotorcraft 101 includes a rotor system 103 with a plurality of rotor blades 111. The pitch of each rotor blade 111 can be managed or adjusted in order to selectively control direction, thrust, and lift of rotorcraft 101. Rotorcraft 101 further includes a fuselage 105 and a tail structure 109. In the illustrated embodiment, tail structure 109 may be used as a horizontal stabilizer. Torque is supplied to rotor system 103 using at least one engine.

In this illustration, rotor blades 111 form a motive subsystem, or in other words, a subsystem that provides the motive force to move the aircraft. The controls that manage or adjust the control direction forms a control subsystem, which can include manual user controls, as well as computer augmentation to manual user control. Furthermore, in some embodiments, rotorcraft 101 may be an autonomous drone vehicle, or a remote-controlled drone vehicle, in which case some control functions are provided remotely (e.g., by a computer program).

Rotorcraft 101 is merely illustrative of the wide variety of aircraft, vehicles, and other objects that are particularly well suited to take advantage of the method and system of the present disclosure. It should be appreciated that myriad other aircraft can also utilize the method and system of the present disclosure. Further, other vehicles and objects can utilize the composite rib structure manufactured by the system and method of the present disclosure. Illustrative embodiments can readily include wind turbine blades, sea-based vehicles, radomes, enclosures, shelters, bridge decks, building facades, ground vehicles, rail vehicles, air vehicles, space vehicles, and manned or un-manned vehicles, to name only a few of the possibilities.

FIG. 1D is a simplified perspective view of a tiltrotor aircraft 125 operating in an airplane mode, according to one example embodiment of the present Specification. In one example, tiltrotor aircraft 125 can include a fuselage 130, a landing gear, a tail member 137, a wing 139, a propulsion system 131, and a propulsion system 135. Each propulsion system can include a fixed engine and a rotatable proprotor 115, 117, respectively. Each rotatable proprotor 115, 117 can have a plurality of rotor blades 119, 121, respectively, associated therewith. The proprotors can rotate from a conversion axis C located above an upper wing skin 123. The position of proprotors 115, 117, as well as the pitch of rotor blades 119, 121, can be selectively controlled in order to control direction, thrust, and lift of tiltrotor aircraft 125.

FIG. 2 illustrates a perspective view of another example tiltrotor aircraft 201. As with all the aircrafts discussed herein, this aircraft illustrated in this embodiment may benefit from improved structural members, such as to be implemented in the wings, as discussed throughout this Specification. Tiltrotor aircraft 201 includes nacelles 203*a* and 203*b*, a wing 205, and a fuselage 207. Each nacelle 203*a* and 203*b* respectively includes a plurality of rotor blades 211. Moreover, each nacelle 203*a* and 203*b* may include an engine and gearbox for driving rotor blades 211. In some embodiments, nacelles 203*a* and 203*b* may each be configured to rotate between a helicopter mode, in which the nacelles 203*a* and 203*b* are approximately vertical, and an airplane mode, in which the nacelles 203*a* and 203*b* are approximately horizontal. In this illustration, rotor blades 211 form a motive subsystem, or in other words, a subsystem that provides the motive force to move the aircraft. The controls that manage or adjust the control direction forms a control subsystem, which can include manual user controls, as well as computer augmentation to manual user control.

A given wing structure or a panel on any of the aircrafts illustrate the wide variety of structures that can include a rib member configured as a lightweight means of generating strength and stiffness in the underlying structure. The panel represents a composite assembly that can include an upper skin, a lower skin, and a set of composite ribs. Any suitable surface can be adhesively bonded to an upper skin and a lower skin. It should be appreciated that any given panel can take on a wide variety of contours, shapes, and configurations.

During manufacture, a given example composite core, having implementation specific geometry, can be carved from raw composite, for example. In another embodiment, the composite core can be manufactured in a net shape such that a subsequent carving procedure is not required. The composite core can be of a wide variety of materials and cell sizes. For example, in one embodiment, the composite core is made from a carbon fiber and resin composite system. The composite core can include a plurality of tubes arranged in a two-dimensional array. However, in one embodiment, the tubes can be selectively positioned such that the end portions are not in the same plane. Each tube can define a passageway or a "cell" extending therethrough. The actual composite core can comprise any suitable number, size, cross-sectional shape, and construction of tubes.

Each tube of the composite core can include a plurality of reinforcement fibers disposed in a polymeric matrix. For example, tubes may comprise fibers comprising one or more of carbon, graphite, glass, an aromatic polyamide (i.e., "aramid") material, a variant of an aromatic polyamide material (e.g., a polyparaphenylene terephthalamide material, such as Kevlar® by E.I. du Pont de Nemours and Company of Richmond, Va.), or the like. The scope of the present disclosure, however, encompasses fibers comprising any suitable material or combination of materials. The polymeric matrix may comprise any suitable resin system, such as a thermoplastic or thermosetting resin for example. Exemplary resins include epoxy, polyimide, polyamide, bismaleimide, polyester, vinyl ester, phenolic, polyetheretherketone (PEEK), polyetherketone (PEK), polyphenylene sulfide (PPS), and the like. The fibers of tubes may be oriented in one or more directions and may be woven or unwoven. It should be appreciated that any tube design may alternatively only include fibers arranged in a single direction, such as a uniaxial or helical fiber configurations. In yet another embodiment, a first ply comprises fibers and a second ply comprises fibers, such that the second ply is laid-up over the first ply.

Figure 3:
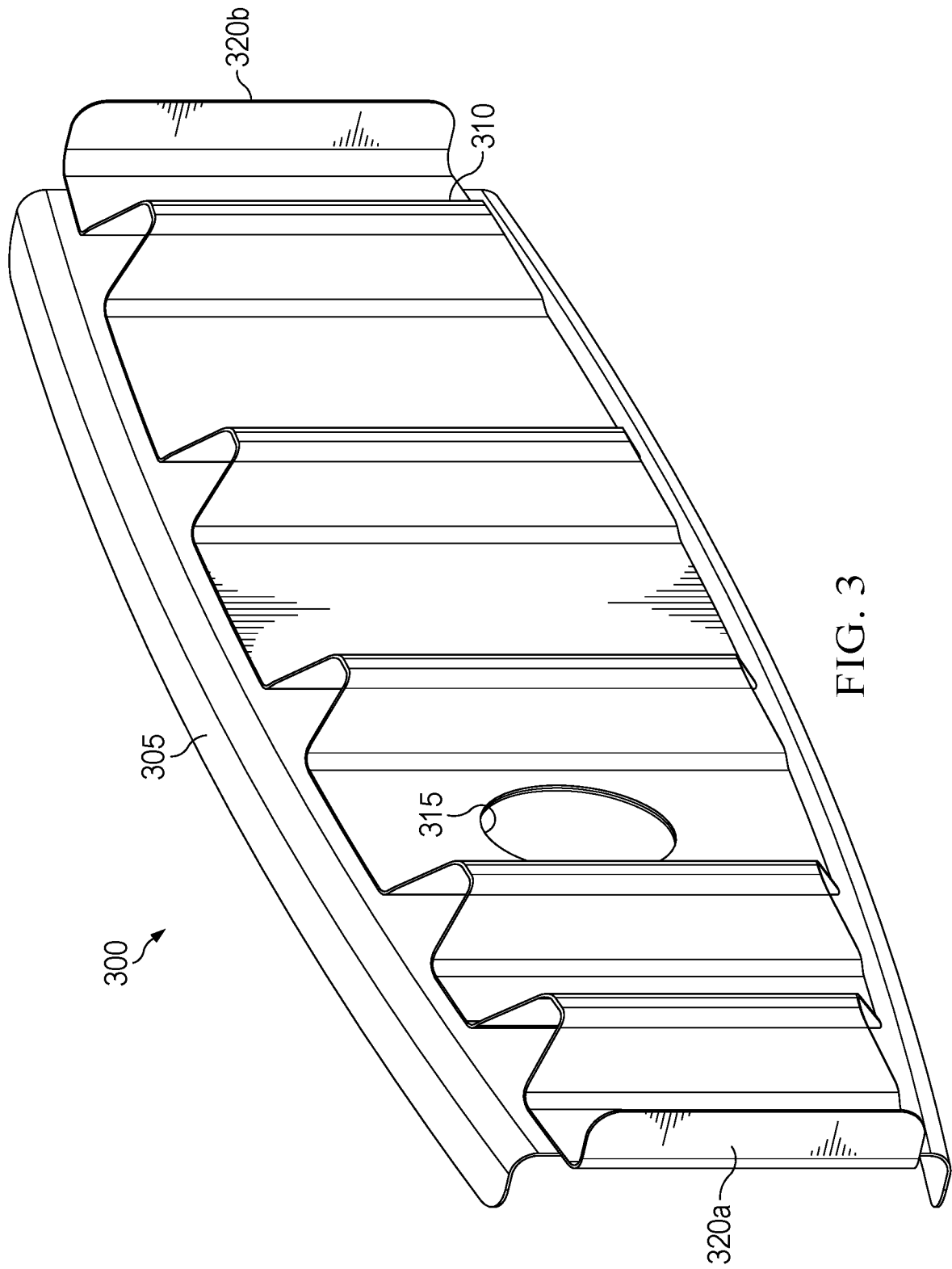
FIG. 3 is a diagrammatic illustration of a composite rib structure according to one example of the present Specification.

FIG. 3 is a diagrammatic illustration of a composite rib structure 300, according to one example of the present Specification. This particular illustration highlights the decrease in manufacturing complexity by creating a single rib out of two parts, each having simple tooling geometry. As discussed throughout this Specification, many of the example implementations of the present disclosure involve separating a curvature in one direction from a curvature in another direction. In a traditional design, there are multiple overlapping corners to be accounted for. Therefore, there are curvatures in multiple directions that designers are constantly trying to accommodate. In the embodiments of the present disclosure, the design being provided is divorcing curvature in one direction from curvature in a different direction. This is being accomplished by having two parts and, for each part, there can exist a simple curvature in one direction.

In this example of FIG. 3, composite rib structure 300 includes two parts: a rib member 310 and a stiffening element 305 for reinforcing composite rib structure 300. Composite rib structure 300 also includes an aperture 315, which can be used for securing (e.g., bonding, mechanical fastening) to any suitable interface (or to other composite rib structures, fuselage, aircraft walls, etc.). Composite rib structure 300 also includes a first and a second interface 320a-b, which in this instance represents the fwd spar interface and the aft spar interface, respectively. It is imperative to note that the terms 'part', 'member', 'piece', and 'element' are used interchangeably herein and, further, these are exceptionally broad terms that simply refer to any shape or component that forms part of the example implementations discussed herein in this disclosure.

Figure 4:
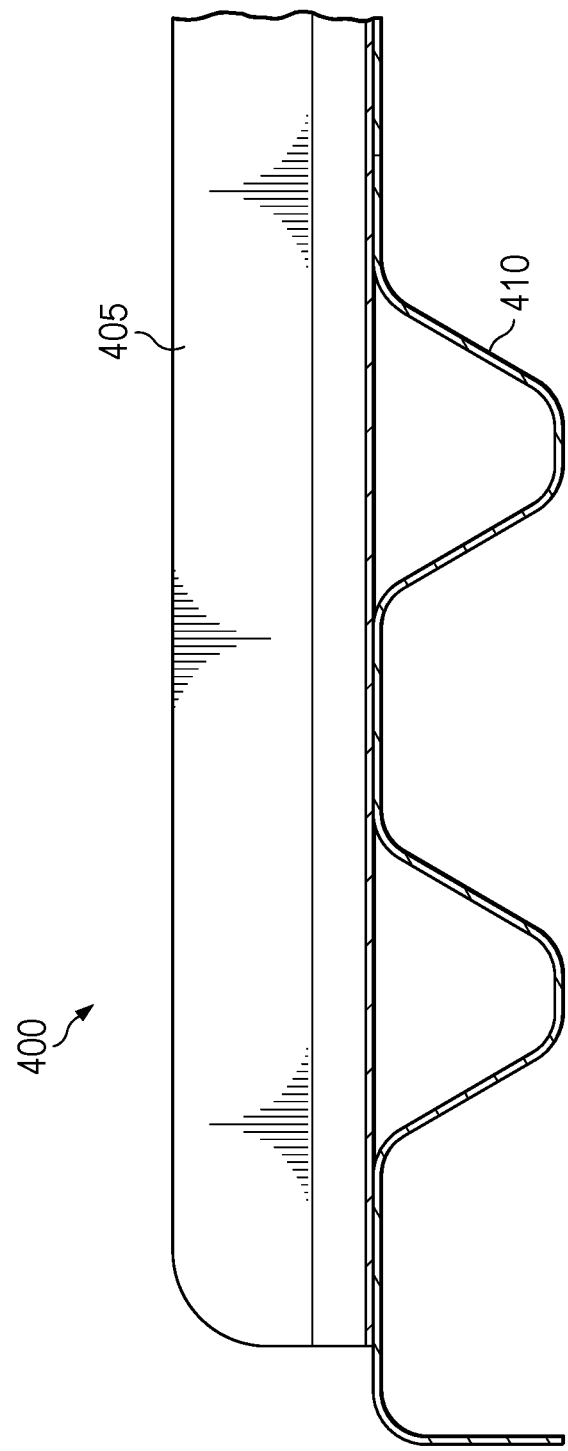
FIG. 4 is a simplified cross-sectional view of the example composite rib structure of FIG. 3.

For composite parts, hat stiffening is an efficient way to increase load capability by increasing buckling resistance. However, hat stiffening geometry can significantly increase manufacturing complexity, especially for parts like aircraft ribs that feature multiple instances of a compound curvature on the tool surface. In addition, decreasing the parts count is preferred in order to minimize assembly operations. Hence, this embodiment of FIG. 3 is constructed of two parts: each part minimizes compound curvatures in the tooling surface. Bonded together, the resulting rib structure would be lightweight and structurally efficient. In one example, the embodiment shown would use tooled surfaces, where composite rib structure 300 interfaces with the wing and the spars to minimize assembly tolerance buildup. As an additional benefit, this architecture allows for part-to-part interfaces to be tooled surfaces as well. FIG. 4 is a simplified cross-sectional view of the example composite rib structure of FIG. 3 looking downward at a two-piece design, generally indicated at 400. This composite rib structure similarly includes two parts: a rib member 410 and a stiffening element 405 for reinforcing the composite rib structure, as discussed herein.

Figure 5A:
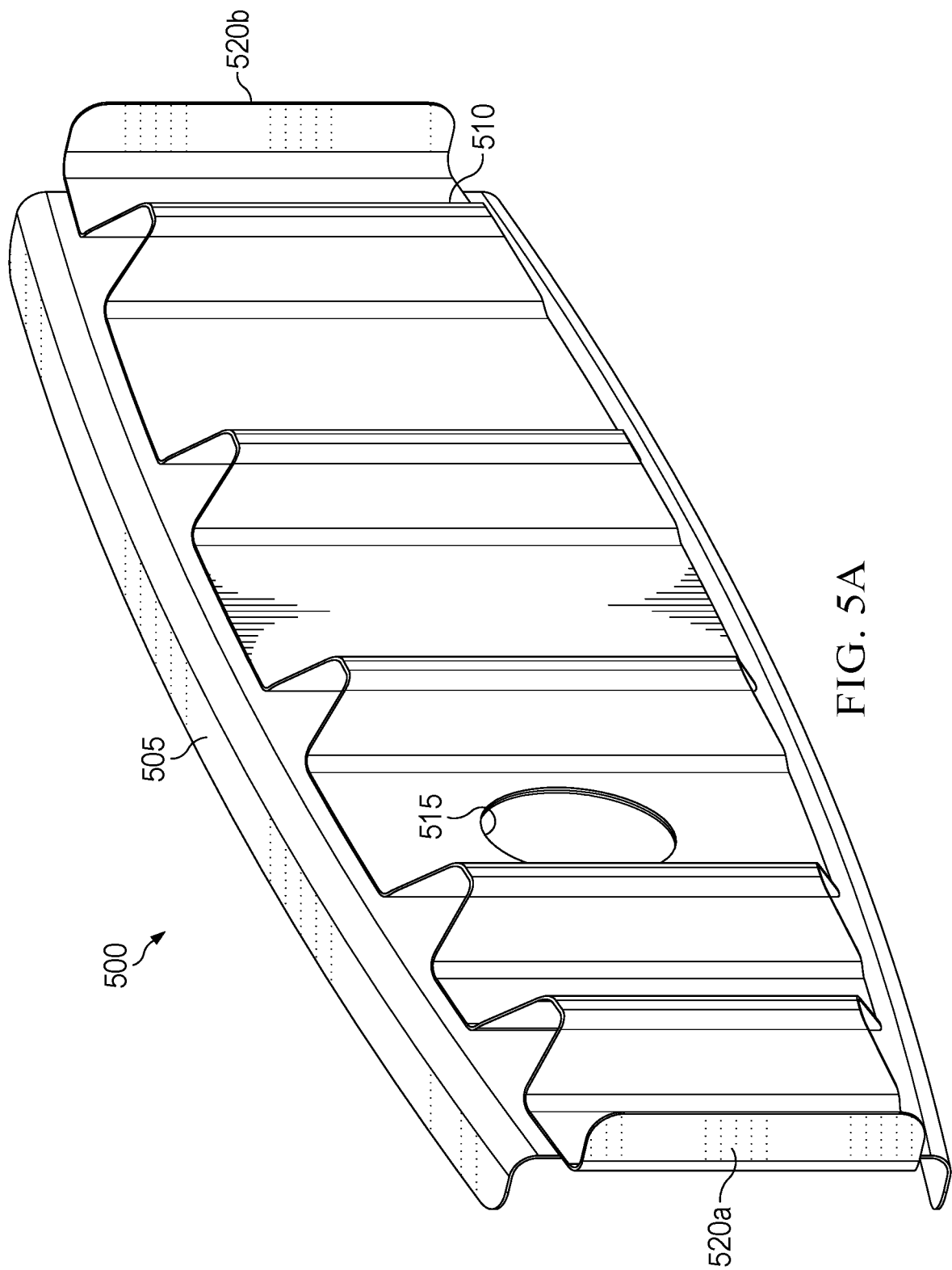
FIGS. 5A-5B are simplified schematic illustrations of an example embodiment of the composite rib from a front view and from a rear view perspective according to the teachings of the present Specification.
Figure 5B:
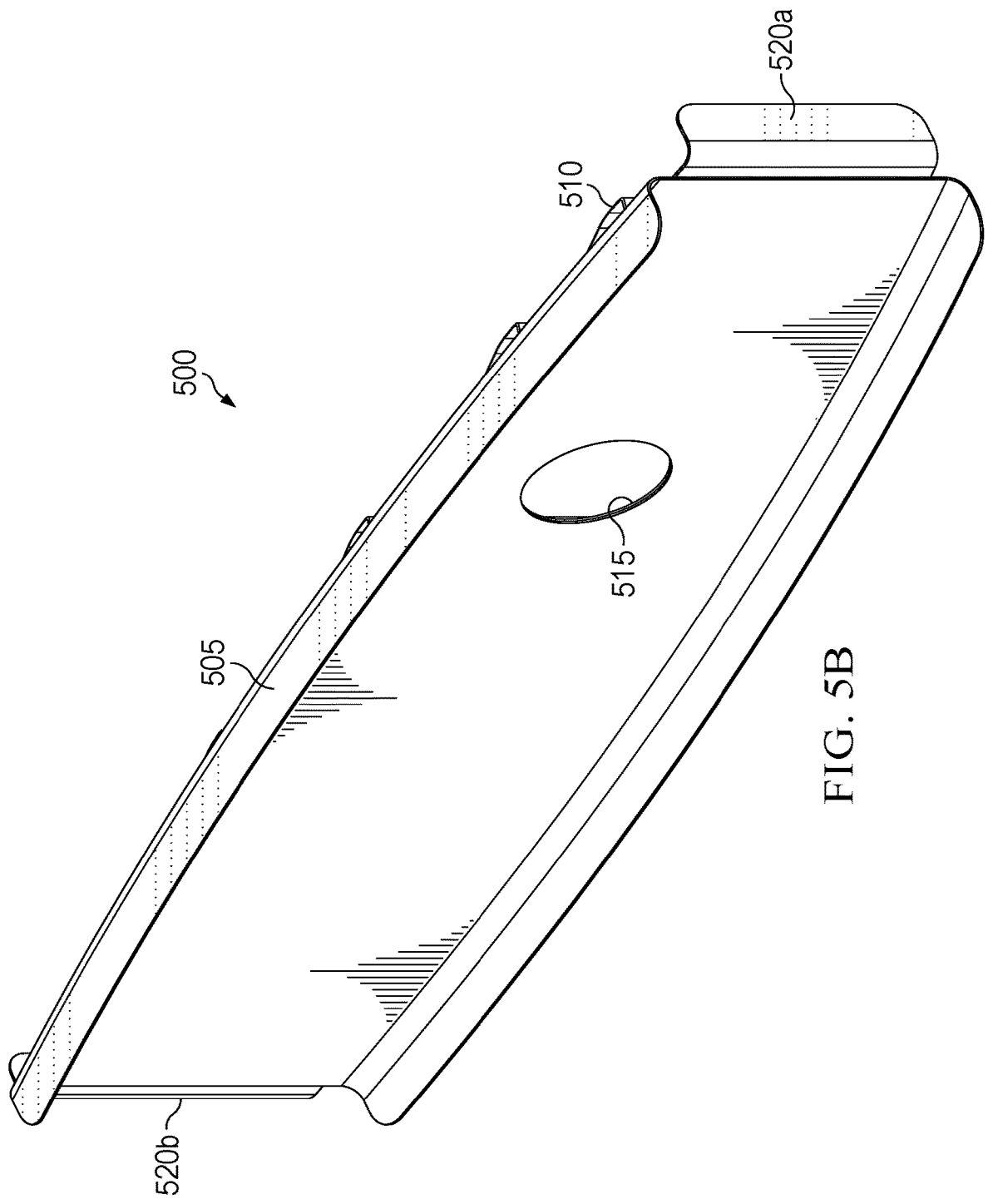

FIGS. 5A-5B are simplified schematic illustrations of an example embodiment of the composite rib from a front view and from a rear view perspective. A composite rib structure is generally indicated at 500 and it similarly includes two parts: a rib member 510 and a stiffening element 505 for reinforcing the composite rib structure, as discussed herein.

Composite rib structure 500 also includes an aperture 515, which can be used for securing (e.g., bonding, mechanically fastening) to any suitable interface (to other composite rib structures, fuselage, aircraft walls, etc.). Composite rib structure 500 also includes a first and a second interface 520a-b, which in this instance represents the fwd spar interface and the aft spar interface, respectively.

Note that any number of holes may be provided in each of the composite pieces to mechanically fasten the composite pieces to an aircraft structure, to other composite pieces, to panels, etc. This applies to all of the example implementations detailed herein. For example, there could be lightning holes provided for any of the pieces, or simple larger holes, which could allow for bonding to other similar structures, or to the surface of an aircraft wall, or to a given fuselage. Hence, the designs illustrated do not have to be monolithic in nature, as any number of holes could be provided to help lighten the weight of the structure, or to provide greater flexibility in fastening such pieces to other parts of a corresponding aircraft. This could include bonding these composite pieces to specific engine parts (e.g., a drive shaft, a transmission, etc.).

For the tolerance build up, recall that a designer is typically trying to fit many such parts within a box of other parts. If any given part is not exactly the right size, or does not conform to exact specifications, then accommodations have to be made for those flaws. In many cases, a simple shim or additional manufacturing enhancements may be necessary to adapt a part to its target environment. If the number of tooled surfaces increases, a designer is essentially ensuring that these parts are as dimensionally accurate as reasonably possible. Hence, the probability of these parts fitting into the overall assembly is thereby increased.

In this example case illustrated in FIGS. 5A-5B, a discontinuous surface is being provided. The corrugated design would sacrifice some of the typical strength that would be found in a single plane. However, alternative embodiments of the present disclosure (as discussed throughout this Specification) can provide a structural member (e.g., one or more stiffening members [or complete panels]) bonded to the rib in order to offer enhanced stiffness to the overall architecture.

Figure 6:
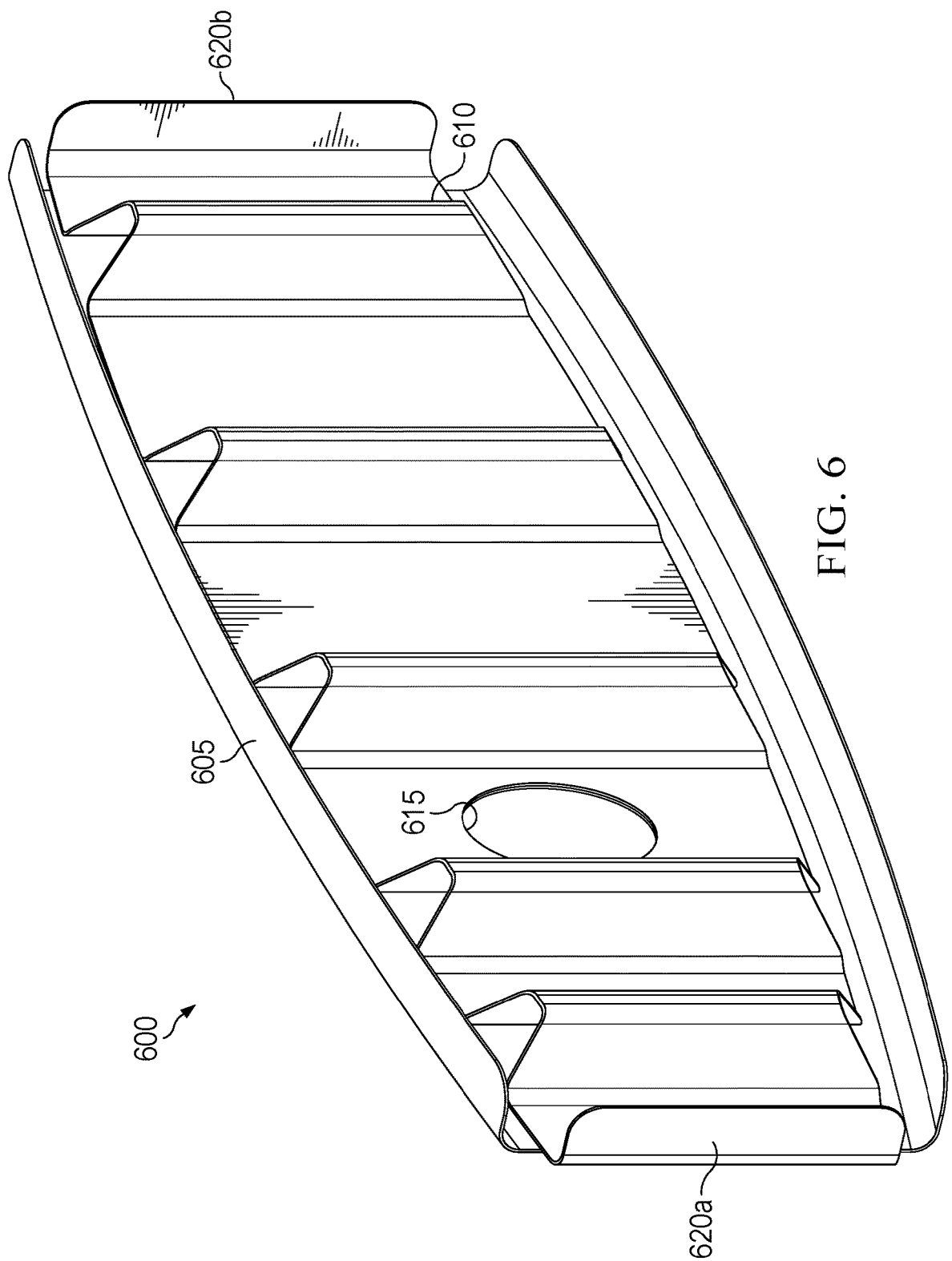
FIG. 6 is a simplified schematic illustration of an alternative embodiment of the present Specification.

FIG. 6 is a simplified schematic illustration of an alternative embodiment of the present Specification. A composite rib structure is generally indicated at 600 and it similarly includes two parts: a rib member 610 and a stiffening element 605 for reinforcing the composite rib structure, as discussed herein.

Composite rib structure 600 also includes an aperture 615, which can be used for securing (e.g., bonding, mechanically fastening) to any suitable interface (or to other composite rib structures, fuselage, aircraft walls, etc.). Composite rib structure 600 also includes a first and a second interface 620a-b, which in this instance represents the fwd spar interface and the aft spar interface, respectively.

Figure 7A:
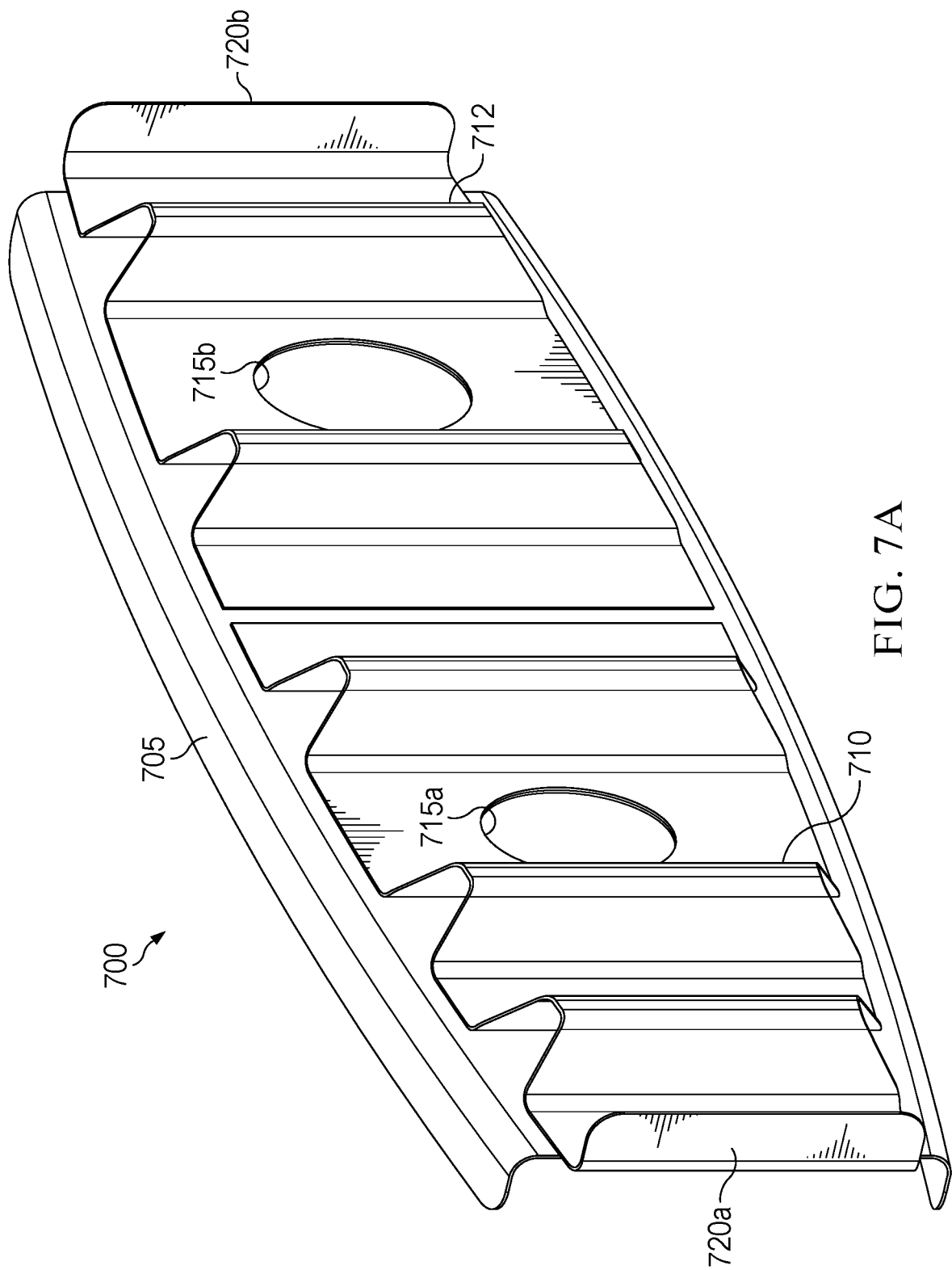
FIGS. 7A-7C are simplified schematic illustrations of additional alternative embodiments of the present disclosure taken from various perspectives.
Figure 7B:
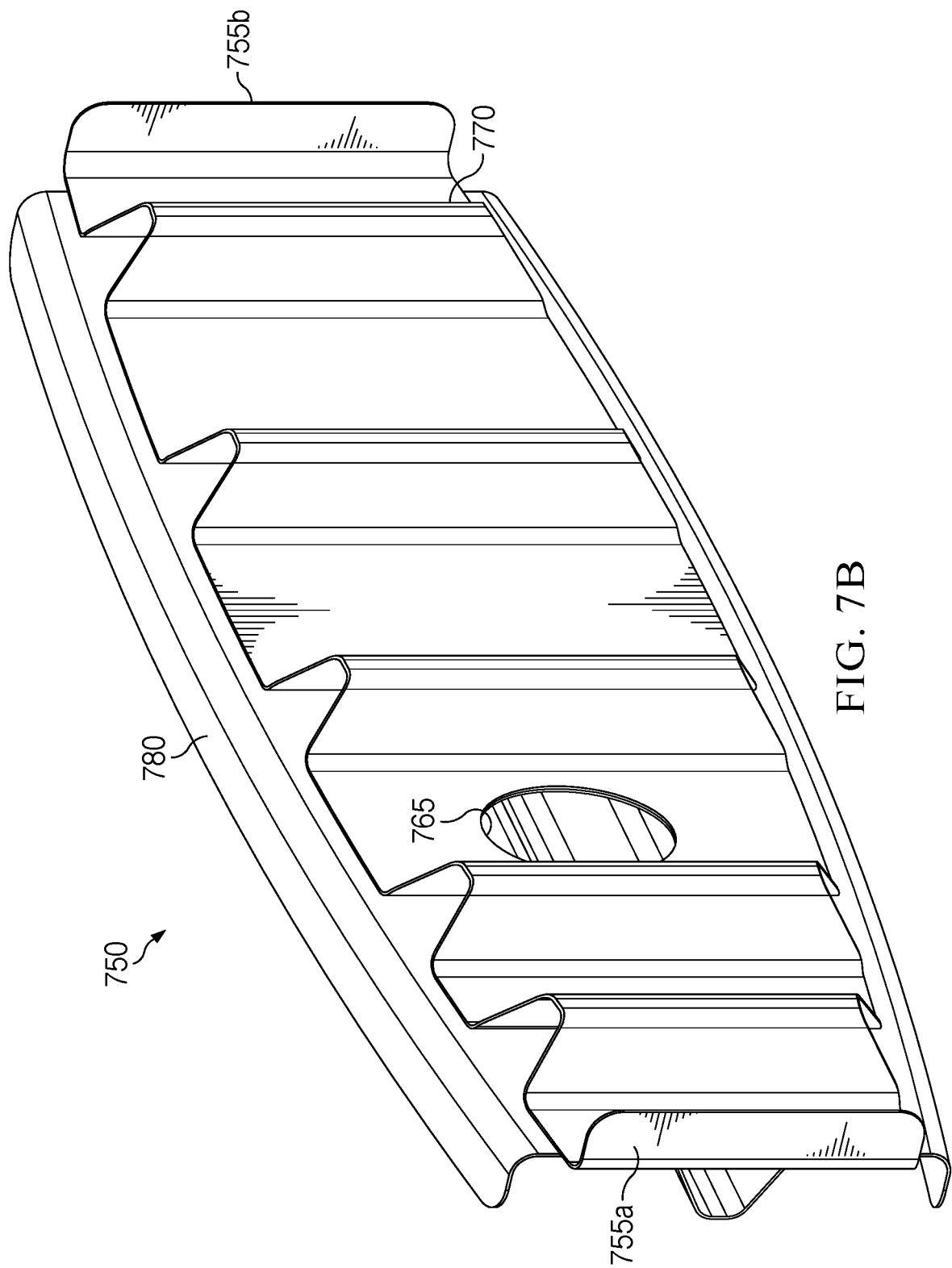
Figure 7C:
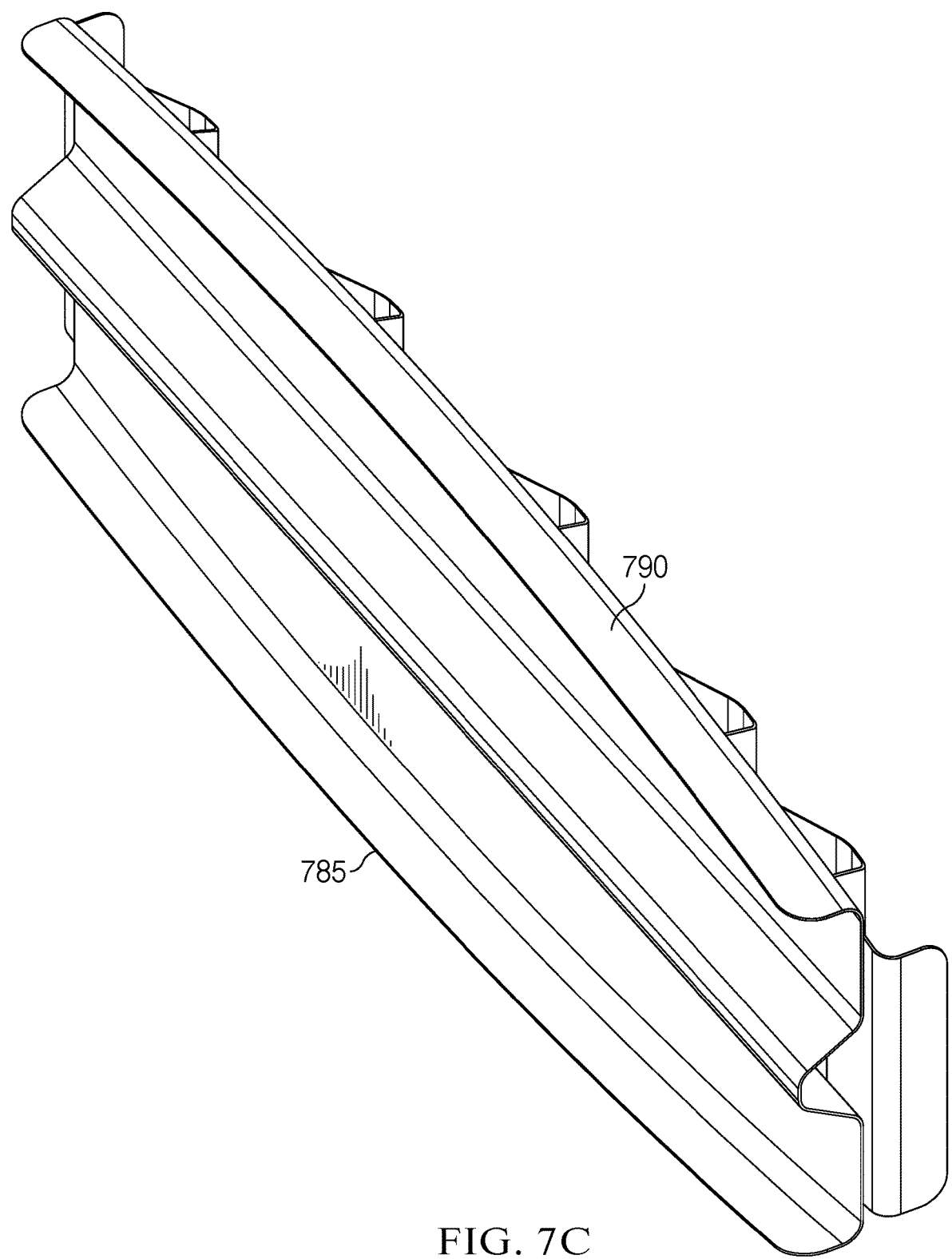

FIGS. 7A-7C are simplified schematic illustrations of additional alternative embodiments of the present disclosure taken from various perspectives. A composite rib structure is generally indicated at 700 and it includes two parts: a rib member 710 and a stiffening element 705 for reinforcing the composite rib structure, as discussed herein. Composite rib structure 700 also includes a set of apertures 715a-b, which can be used for securing (e.g., bonding, mechanically fastening) to any suitable interface (or to other composite rib structures, fuselage, aircraft walls, etc.). In this non-limiting example, one aperture has a clear passage through composite rib structure 700, while a second aperture is obstructed by stiffening element 705. Composite rib structure 700 also includes a first and a second interface 720a-b, which in this instance represents the fwd spar interface and the aft spar interface, respectively. Additionally, the example of FIG. 7A includes a two-piece rib configuration 710, 712, which is bonded together with stiffening element 705. Note that any of these three components can be manufactured using different specifications, varied materials or manufactured separately and brought together to be bonded for specific placement needs of an aircraft, a panel, etc.

FIG. 7B illustrates a schematic view of an alternative embodiment of the present disclosure. A composite rib structure is generally indicated at 750 and it includes two parts: a rib member 770 and a stiffening element 780 for reinforcing the composite rib structure. Composite rib structure 750 also includes an aperture 765, which can be used for securing (e.g., bonding, mechanically fastening) to any suitable interface (or to other composite rib structures, fuselage, aircraft walls, etc.). Composite rib structure 750 also includes a first and a second interface 755-b, which in this instance represents the fwd spar interface and the aft spar interface, respectively. FIG. 7C illustrates a back view of composite rib structure 750, which further includes interfaces 785 and 790. This hallowing out of the material would reduce the weight of the corresponding assembly at the tradeoff of losing some of the strength (structural integrity) of the overall design.

Figure 8:
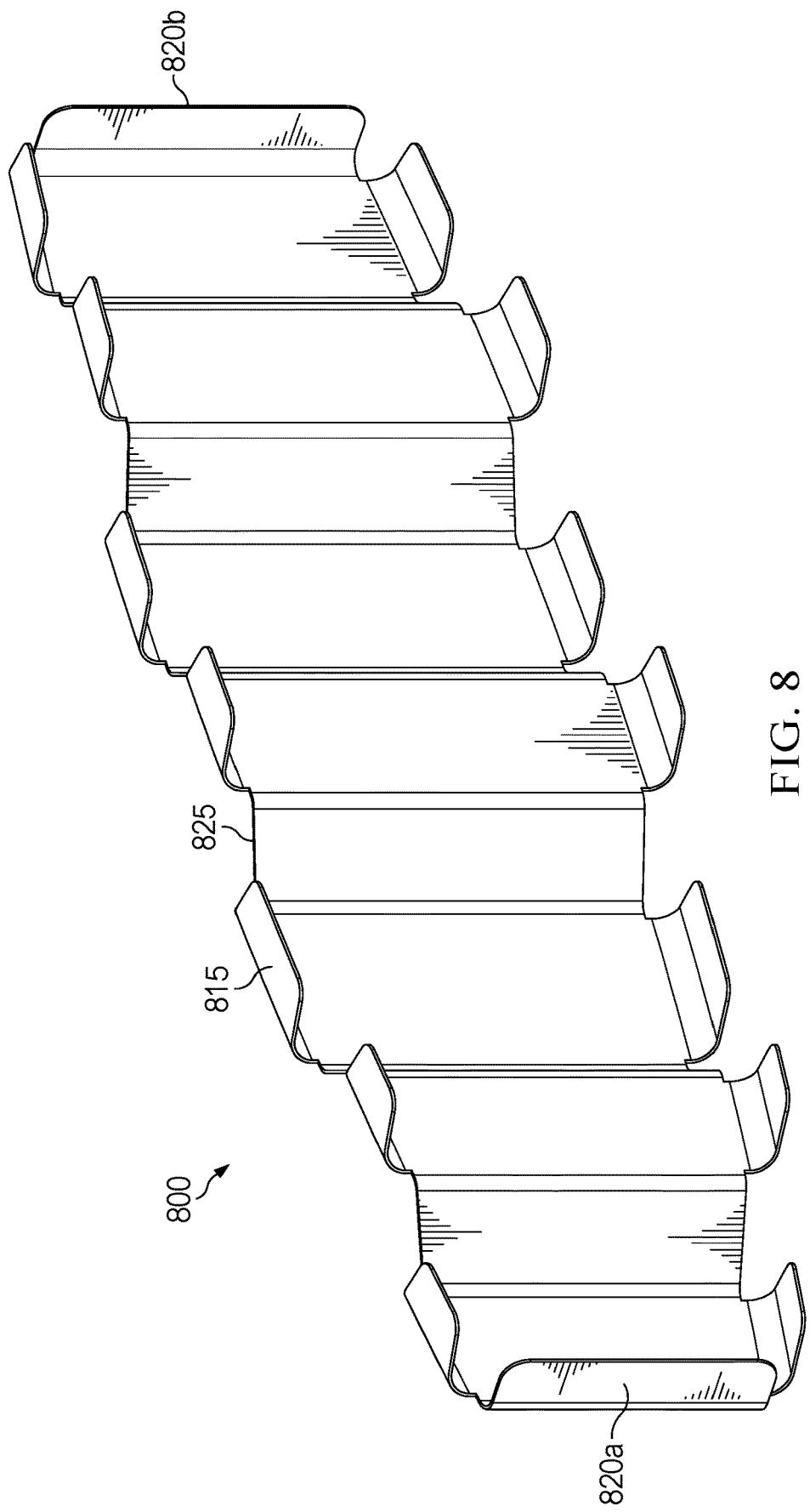
FIG. 8 is a simplified schematic diagram of a corrugated rib structure in accordance with one embodiment of the present Specification.

FIG. 8 is a simplified schematic diagram of a corrugated rib structure 800 in accordance with one embodiment of the present Specification. Corrugated rib structure 800 includes a set of interfaces 820a-b, along with a set of discontinuous caps 815 that are interleaved with rectangular members 825, which do not have caps. Hence, a single corrugated rib is provided, and it could be mounted in any of the same ways that the implementations discussed herein would be mounted. The same concepts associated with weight efficiency, simplified manufacturing, decreases in tolerance buildup during assembly would be applicable to the embodiment shown.

Figure 9:
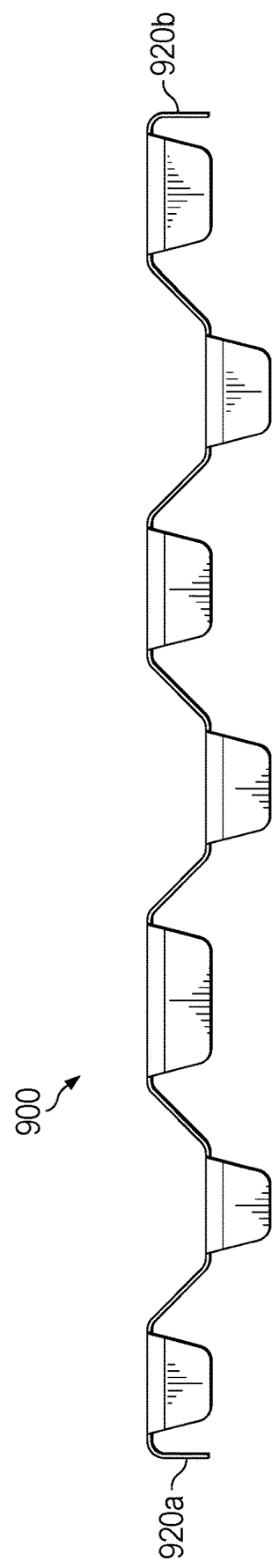
FIG. 9 is a simplified top view of another corrugated rib structure in accordance with one embodiment of the present Specification.

FIG. 9 is a simplified top view of a corrugated rib structure 900 in accordance with one embodiment of the present Specification. Corrugated rib structure 900 includes a set of interfaces 920a-b to be secured to any appropriate surface. This implementation reflects a rib structure with a corrugated web and discontinuous caps. In one example implementation, the rib could be fabricated from composite material or sheet metal. Flat patterns could be tailored such that splices, darts, etc. would fall outside of the trimmed final resultant part. In one embodiment, corrugated rib structures 800 and 900 would use tooled surfaces, where the part effectively interfaces with a wing and spars to minimize assembly tolerance buildup.

Figure 10:
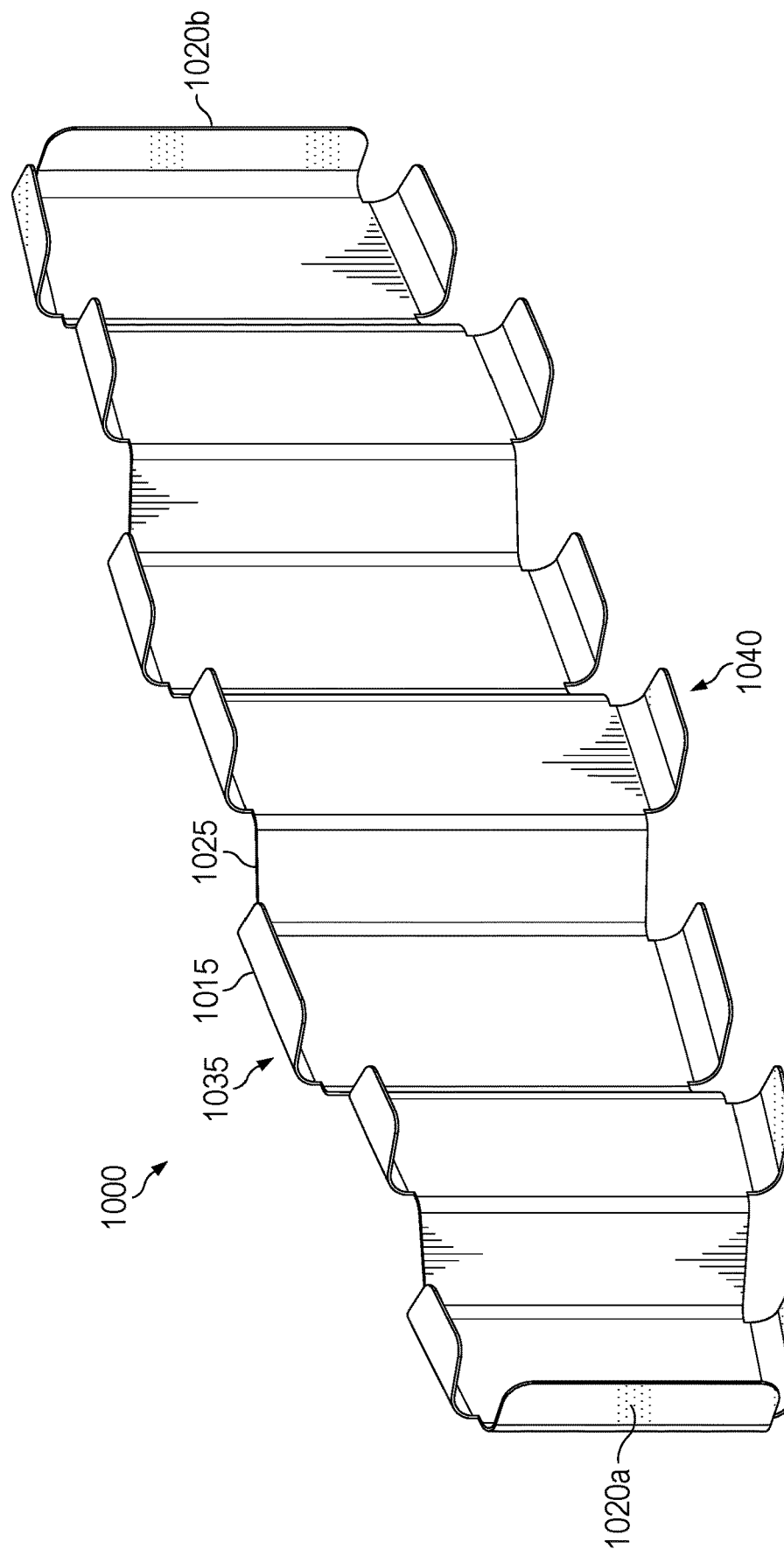
FIG. 10 is a simplified schematic diagram of another corrugated rib structure in accordance with one embodiment of the present Specification.

FIG. 10 is a simplified schematic diagram of a corrugated rib structure 1000 in accordance with one embodiment of the present Specification. Corrugated rib structure 1000 includes a set of interfaces 1020a-b, along with a set of discontinuous caps 1015 that are interleaved with rectangular members 1025 that do not have caps. This particular implementation reflects a rib structure with a corrugated web and discontinuous spar caps. In one example implementation, corrugated rib structure 1000 includes an upper skin surface 1035 and a lower skin surface 1040 to be secured to any suitable surface.

Figure 11A:
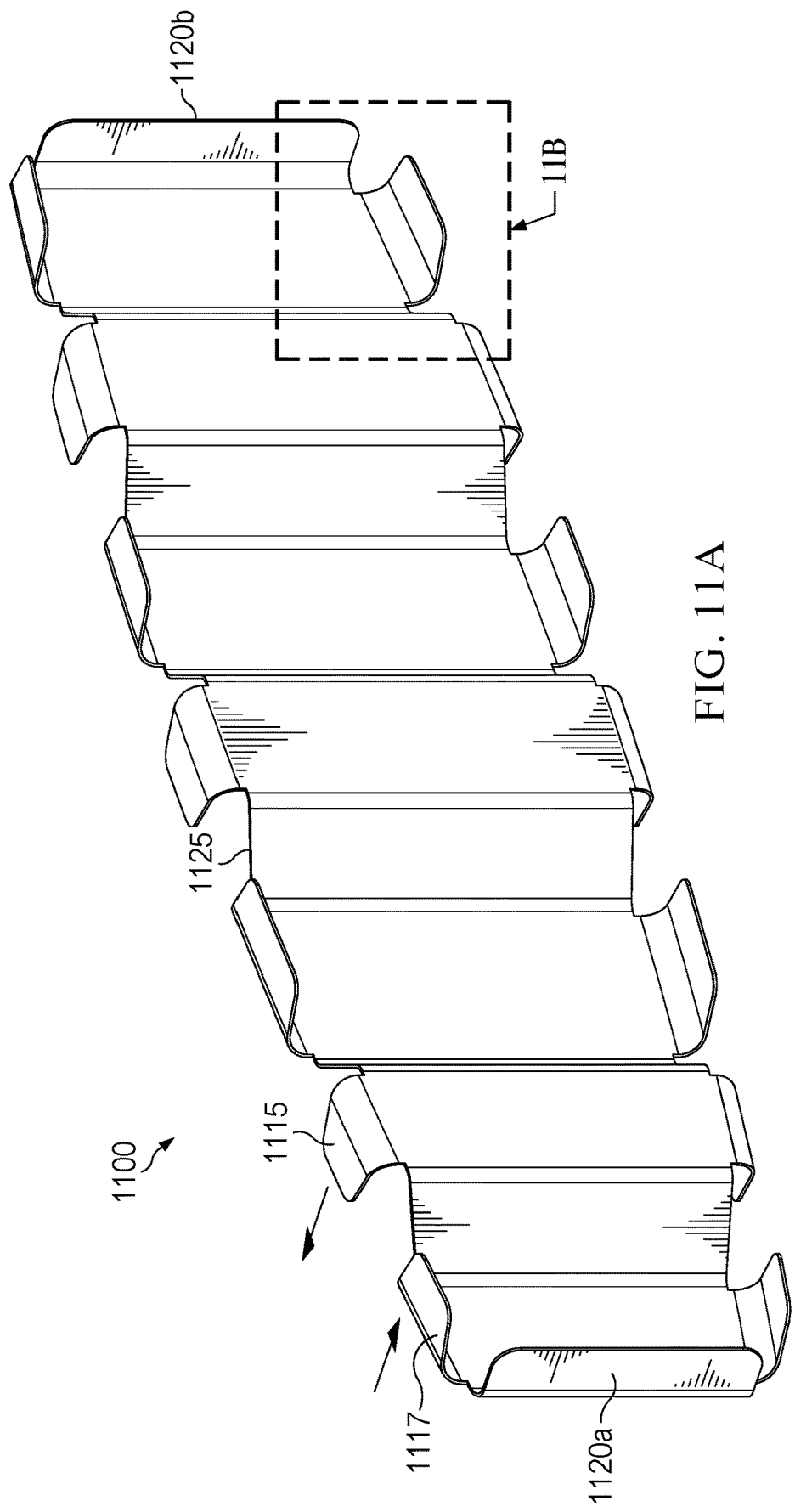
FIG. 11A is a simplified schematic diagram of yet another corrugated rib structure in accordance with one embodiment of the present Specification.

FIG. 11A is a simplified schematic diagram of a corrugated rib structure 1100 in accordance with one embodiment of the present Specification. Corrugated rib structure 1100 includes a set of interfaces 1120a-b, along with a set of discontinuous caps 1115, 1117 that form alternating directions in a first plane and in a second plane with respect to rectangular members 1125, which have no caps. This particular implementation similarly reflects a rib structure with a corrugated web and discontinuous spar caps. In one example implementation, corrugated rib structures 1000 and 1100 includes a lower skin surface and an upper skin surface to be securely bonded to any suitable surface.

Figure 11B:
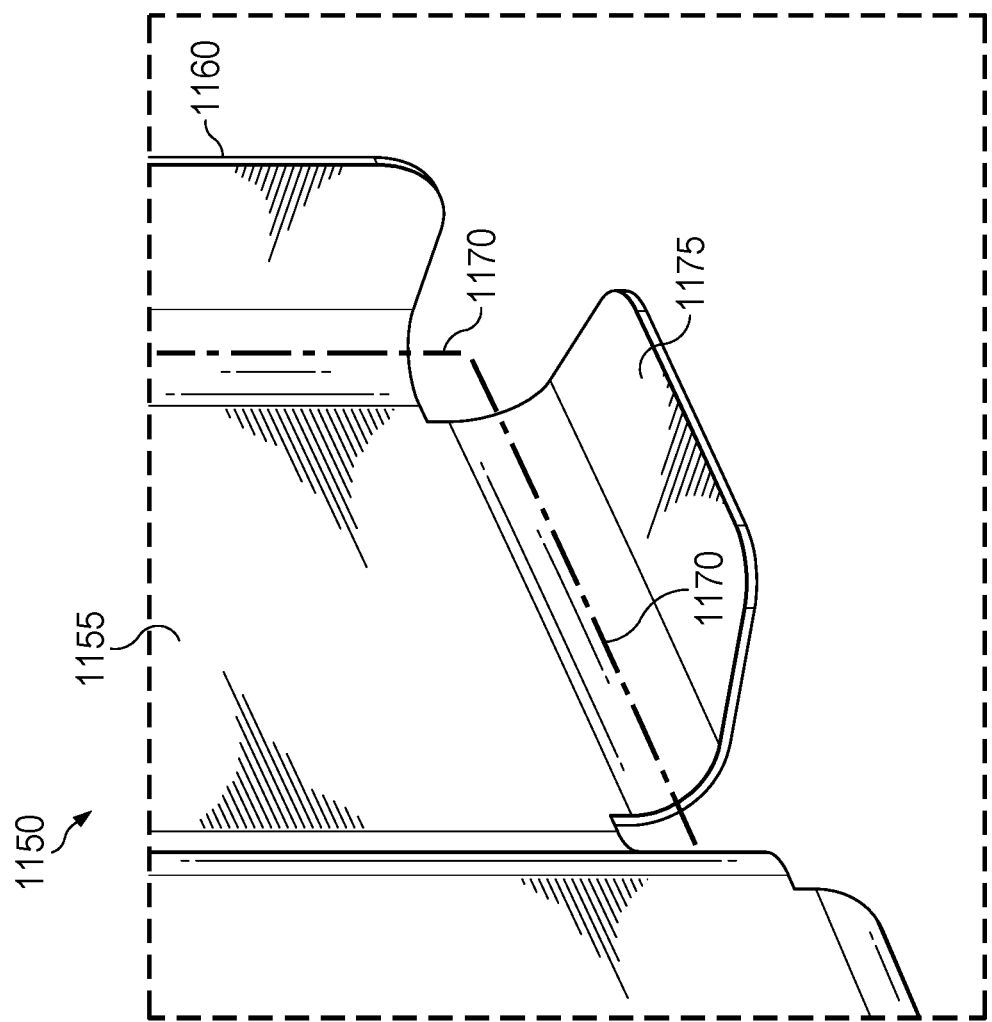
FIG. 11B is a simplified expanded view of the rib structure of FIG. 11A in accordance with one example implementation.

FIG. 11B is a simplified expanded view (generally indicated at 1150) of the rib structure of FIG. 11A in accordance with one example implementation. This particular example includes a rib web 1155, along with a spar attach flange 1160, which extends toward a line of curvature 1170. Consistent with FIG. 11A, a rib cap 1175 is provided from line of curvature 1170. It is imperative to note that any of the example dimensions, configurations, spacing, and overall specifications have only been offered for purposes of teaching and illustration only. Any of the example implementations discussed herein could readily be altered or modified considerably without departing from the broad scope of the present disclosure.

Figure 12A:
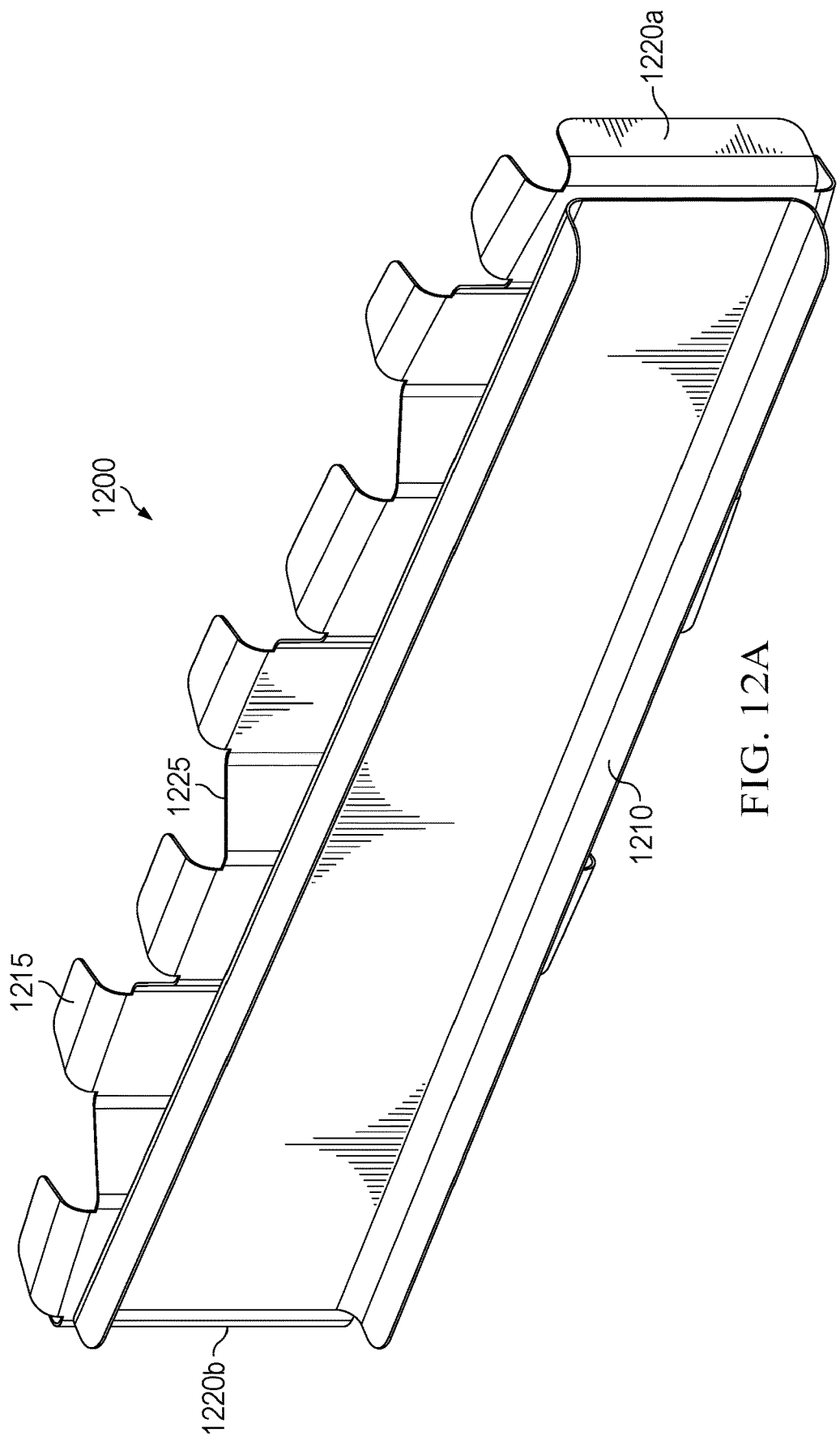
FIGS. 12A-12B are simplified schematic illustrations of an alternative embodiment of a corrugated rib structure.
Figure 12B:
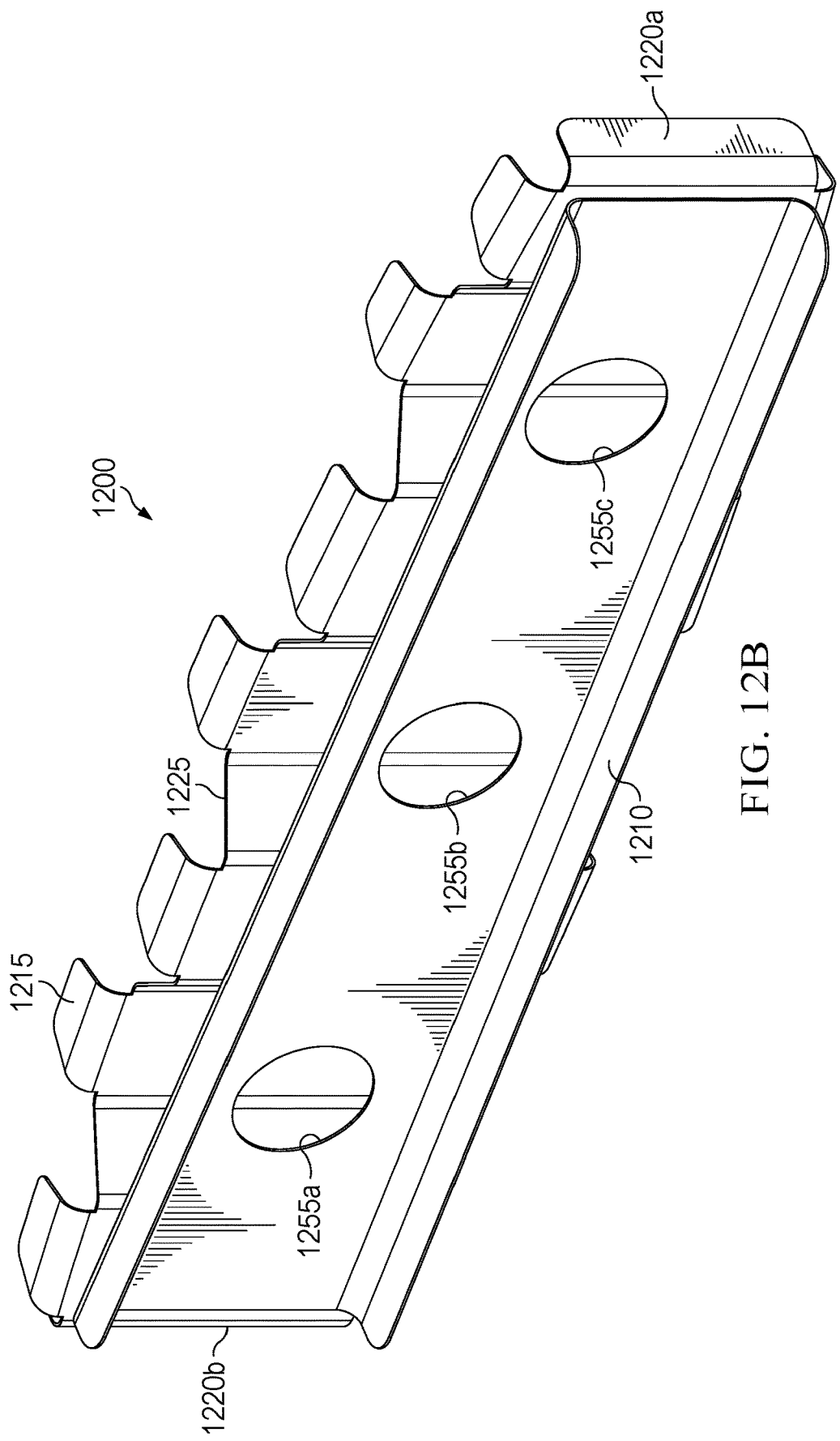

FIGS. 12A-B are simplified schematic illustrations of an alternative embodiment of a corrugated rib structure. A composite rib structure is generally indicated at 1200 and it similarly includes two parts: a rib member 1205 and a stiffening element 1210 for reinforcing the composite rib structure. In the embodiment of FIG. 12B, composite rib structure 1200 also includes a plurality of apertures 1255a-c, which can be used for securing (e.g., bonding, mechanically fastening) to any suitable interface (or to other composite rib structures, fuselage, aircraft walls, etc.). Composite rib structure 1200 also includes a first and a second interface 1220a-b, which in this instance represents the fwd spar interface and the aft spar interface, respectively.

Figure 13:
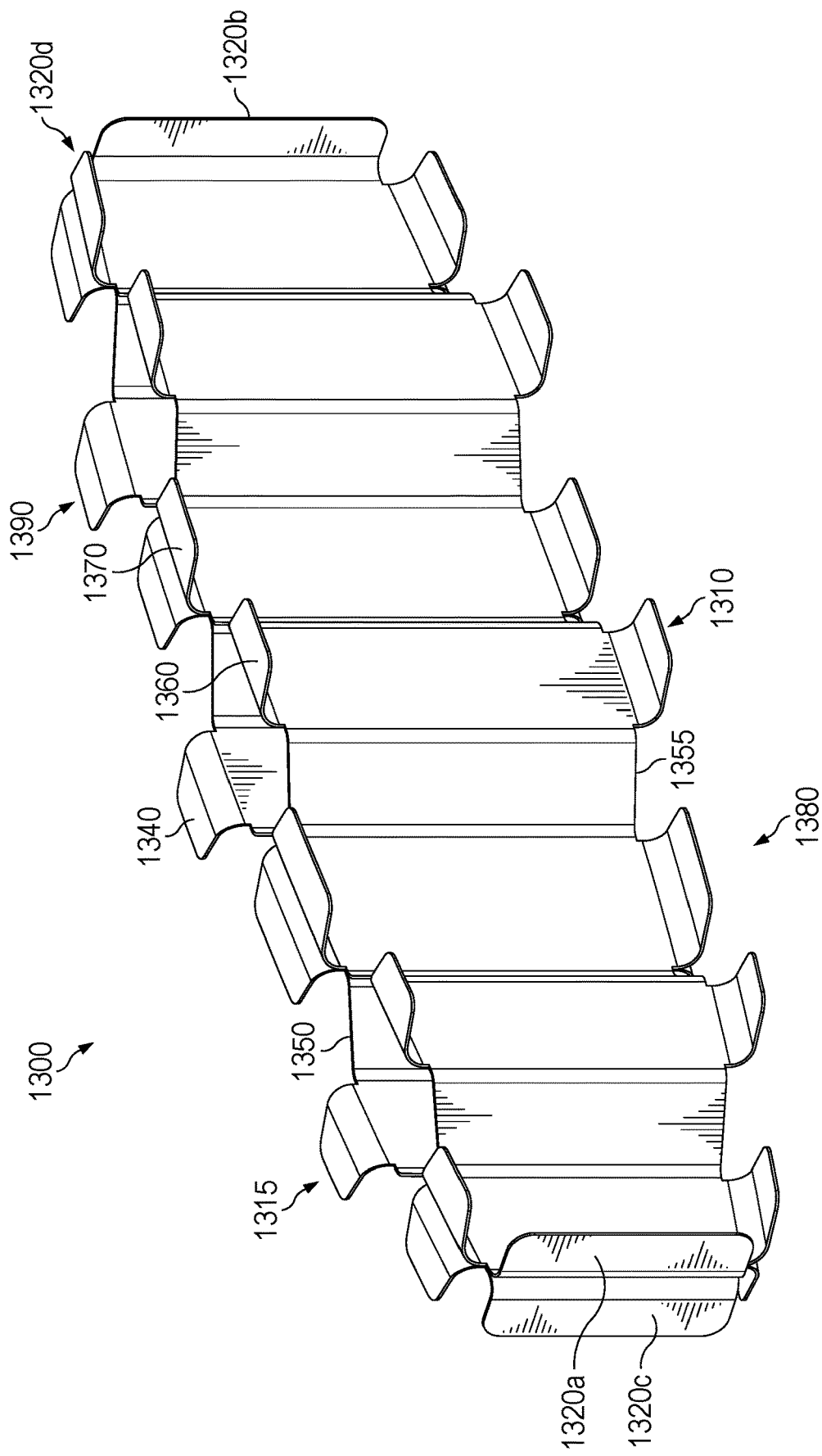
FIG. 13 is a simplified schematic diagram illustrating yet another alternative embodiment of the present Specification.

FIG. 13 is a simplified schematic diagram illustrating yet another alternative embodiment of the present Specification. FIG. 13 illustrates a corrugated rib structure 1300 in accordance with one embodiment of the present Specification. Corrugated rib structure 1300 includes a two-piece design in which a first corrugated rib member 1315 is suitably bonded together with a second corrugated rib member 1310. Corrugated rib structure 1300 includes a set of interfaces 1320a-d, along with a set of discontinuous caps 1340 that are interleaved with rectangular members 1350, which have no caps. Second corrugated rib structure 1310 includes discontinuous caps 1360 and 1370 separated by rectangular members 1355. In this one non-limited example of FIG. 13, corrugated rib structure 1300 is using two pieces that face away from each other. This example could be used for a particular aircraft's architectural needs, but it is in no way limiting to the broad scope of the present disclosure. In other scenarios, this two-piece configuration could be mated together or fashioned such that the caps are continuous with respect to each other, or are overlapping in the same direction. Other example implementations include a coincident positioning of these configurations, or a layering, or an appropriate offset in the same or in opposite directions. Considerable flexibility is provided in the teachings of the present disclosure. In one example implementation, corrugated rib structure 1300 includes a lower skin surface 1380 and an upper skin surface 1390 for bonding to any suitable surface.

Figure 14:
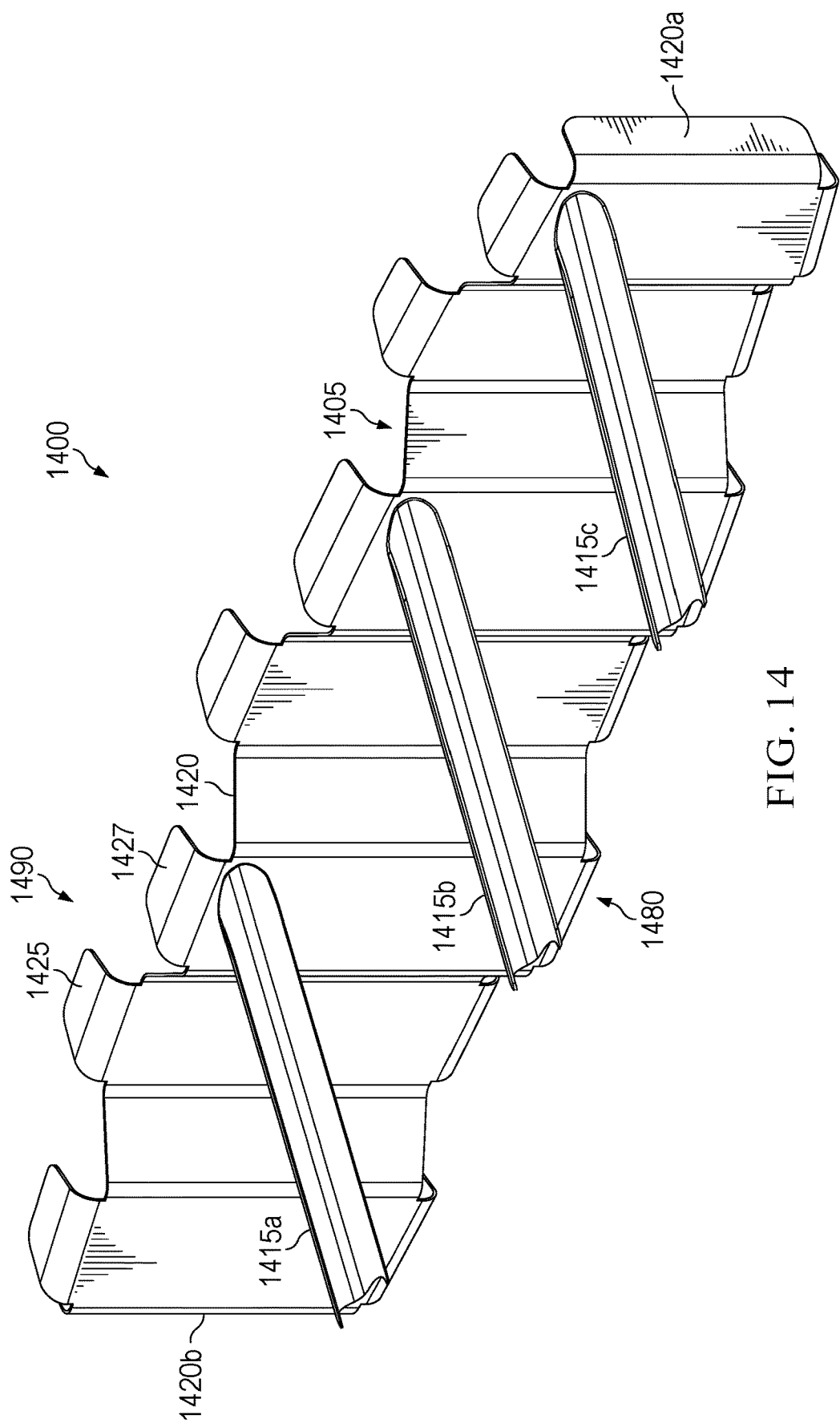
FIG. 14 is a simplified schematic illustration of an alternative embodiment of a corrugated rib structure.

FIG. 14 is a simplified schematic illustration of an alternative embodiment of a corrugated rib structure. A composite rib structure is generally indicated at 1400 and it similarly includes two parts: a rib member 1405 and a set of stiffening elements 1415a-c for reinforcing the composite rib structure. These stiffening elements can be used for securing (e.g., bonding, mechanically fastening) to any suitable interface (or to any other composite rib structures, fuselage, aircraft walls, etc.). Composite rib structure 1400 also includes a first and a second interface 1420a-b, which in this instance represents the fwd spar interface and the aft spar interface, respectively. In one example implementation, corrugated rib structure 1400 includes a lower skin surface 1480 and an upper skin surface 1490 for bonding to any suitable surface. Corrugated rib structure 1400 includes a set of discontinuous caps 1425, 1427 that are interleaved with rectangular members 1420, which have no caps.

Figure 15:
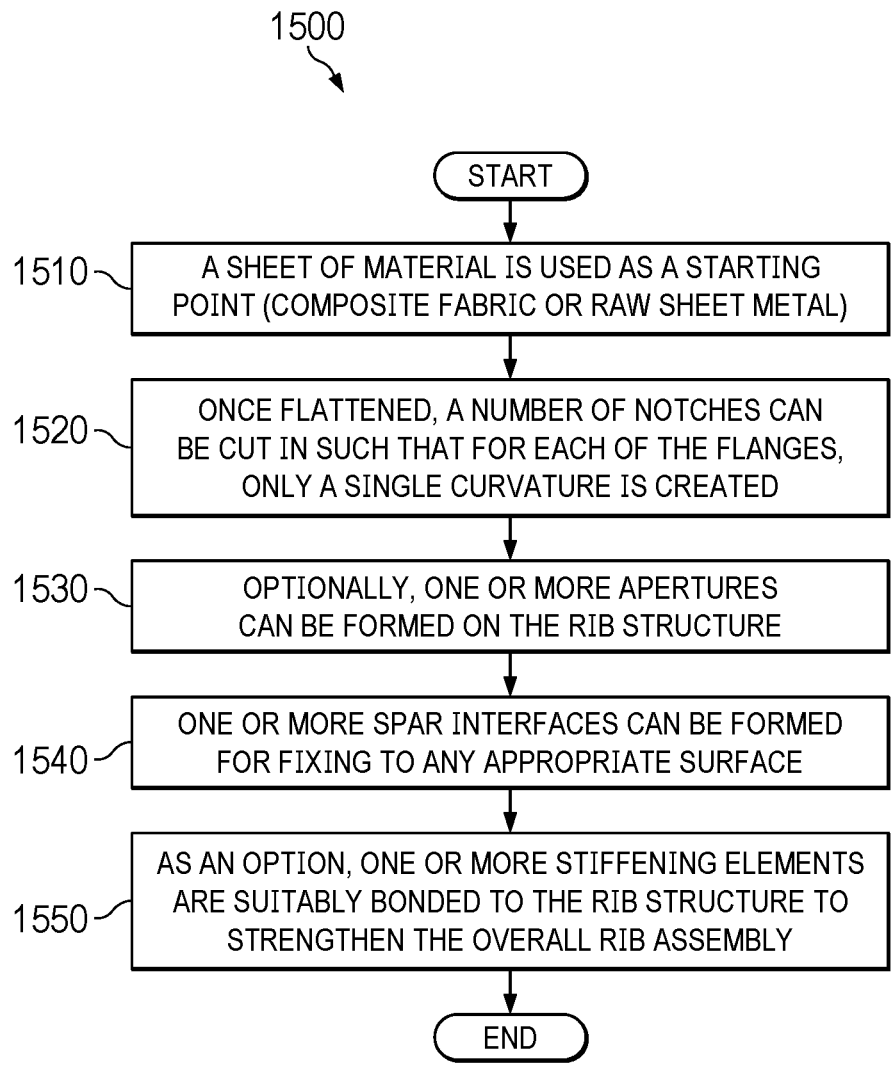
FIG. 15 is a simplified flowchart of a method of manufacturing a rib structure, according to one embodiment of the present Specification.

FIG. 15 is a simplified flowchart of a method of manufacturing 1500 a rib structure, according to one embodiment of the present Specification. The method may begin at step 1510 in which a sheet of material can be used as a starting point. This could include a composite fabric or raw sheet metal. Once it is flattened out, a number of notches can be cut in such that for each of the flanges, only a single curvature is created. This is reflected by step 1520. The flat pattern has reduced complexity, while avoiding the folded over corner design.

Note that in many industrial and/or aerospace applications, the desired thickness of the metal may be between 2 and 8 inches. However, other materials of other thicknesses could be used, such as aluminum, titanium, or steel, with thicknesses between 1 and 8 inches. Other materials could readily be used in such manufacturing, as discussed throughout this disclosure.

In step 1530, one or more apertures can be formed on the rib structure. Note that such apertures are not necessary and only offer an option for the designer based on particular architectural needs. In step 1540, one or more spar interfaces can be formed for fixing to any appropriate surface. In step 1550, and only as a potential option for the designer, any number of stiffening elements (such as those discussed herein) could be suitably bonded to the rib structure to strengthen the overall rib assembly. In such a case, any appropriate fixing mechanisms could be implemented to secure be two parts together in a suitable fashion.

In terms of the bonding possibilities, heat could be used to bond materials together in one example implementation. Other implementations can include bonding through the use of any type of mechanical fastener, riveting, glue, bolting, soldering, welding, or any other appropriate mechanism for fixing two pieces together in a secure fashion. In terms of an alternative embodiment, it should be noted that the choice to have the flanges pointed in different directions is simply up to the designer. Flanges can face the same direction, different directions, alternating directions, or form other patterns based on particular needs of a wing, an aircraft, etc. In one scenario, one or both of the surfaces may be tooled.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Embodiments of the teachings of the present Specification may include the following nonlimiting examples, substantially as described. Example 1 is a rib structure to be used, for example, in any number of aerospace applications, comprising: an integral piece having a corrugated web that includes a plurality of discontinuous flanges to interface with a plurality of skin surfaces. In Example 2, the system of Example 1 provides that the plurality of discontinuous flanges includes flange directions that are in substantially similar planes. In Example 3, the system of Example 1 provides that the plurality of discontinuous flanges includes flange directions that are in alternating planes. In Example 4, the system of Example 1 further comprises one or more panels bonded to the rib structure in order to offer enhanced stiffness.

Example 5 is a rib structure, comprising: a first piece having a first curvature in a first plane; and a second piece having a second curvature in a second plane that is different from the first plane, the first piece and the second piece are bonded together to form the rib structure. Example 6 includes the rib structure of Example 5, where the first piece further comprises a plurality of discontinuous flanges to interface with a plurality of skin surfaces.

Example 7 includes the rib structure of Example 5, where the first piece includes an aft spar interface for bonding to a surface. Example 8 includes the rib structure of Example 5, where the first piece includes a forward spar interface for bonding to a surface. Example 9 includes the rib structure of Example 5, where the second piece includes an upper skin interface to be used in bonding to a surface. Example 10 include the rib structure of Example 5, where the second piece includes a lower skin interface to be used in bonding to a surface.

Example 11 includes the rib structure of Example 5, where the first piece and the second piece include a coincident hole defined through the first and the second pieces. Example 12 includes the rib structure of Example 5, where the first piece includes an undulating pattern that includes rectangular pieces and a plurality of flanges that are in substantially similar planes. Example 13 includes the rib structure of Example 5, where the second piece serves as a stiffening member in offering structural strength to the rib structure.

Example 14 is a method for creating a rib structure, comprising: forming a first piece out of a flat pattern of material to produce a first curvature in a first plane; forming a second piece out of a flat pattern of material to produce a second curvature in a second plane that is different from the first plane; and bonding the first piece and the second piece together to form the rib structure. Example 15 includes the method of Example 14 and further comprising: folding at least a portion of the first piece to form one or more corrugations. Example 16 includes the method of Example 14 and further comprising: folding at least a portion of the first piece to form one or more spar interfaces. Example 17 includes the method of Example 14, where the first curvature includes an upper skin interface to be bonded with a surface. Example 18 includes the method of Example 14 where the second curvature includes a lower skin interface to be bonded with a surface.

Example 19 is an aircraft panel, comprising: a rib structure that further comprises: a first piece having a first curvature in a first plane; a second piece having a second curvature in a second plane that is different from the first plane, where the first piece and the second piece are bonded together to form the structural member. Example 20 includes the aircraft panel of Example 19 where the first piece further comprises a plurality of discontinuous flanges to interface with a plurality of skin surfaces. Example 21 includes the aircraft panel of Example 19 where the first piece includes an aft spar interface for bonding to a surface.

Example 22 includes the aircraft panel of Example 19, where the second piece includes an upper skin interface to be used in bonding to a surface, and where the second piece includes a lower skin interface to be used in bonding to a surface. Example 23 includes the aircraft panel of Example 19, where the first piece includes an undulating pattern that includes rectangular pieces and a plurality of flanges that are in substantially similar planes. Example 24 includes the aircraft panel of Example 19, where the aircraft panel is configured to be positioned into a selected one of a group of elements, the group consisting of: a fuselage; an aircraft wall; a transmission; and a drive shaft. There is further disclosed an example of a plurality of aircraft panels manufactured according to the methods and processes of the above examples. There is further disclosed an example aircraft comprising a plurality of the rib structures illustrated above that form an aircraft panel. There is further disclosed an example aircraft, where the aircraft is a rotary aircraft.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "a plurality of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

The invention claimed is:

1. A rib structure, comprising:
 a first piece comprising a first single continuous piece of material and comprising a first curvature in a first plane, wherein the first curvature comprises a first plurality of ribs on a front surface of the first piece and extending between opposite first and second edges of the first piece; and
 a second piece comprising a second continuous piece of material and comprising a second curvature in a second plane that is different from the first plane,
 wherein rear surfaces of the first piece and the second piece are bonded together to form the rib structure, and
 wherein the first piece further comprises a plurality of discontinuous flanges on at least one of the first and second edges of the first piece, the plurality of discontinuous flanges extending perpendicular to the front surface of the first piece.

2. The rib structure of claim 1, wherein the plurality of discontinuous flanges are configured to interface with a plurality of skin surfaces.

3. The rib structure of claim 1, wherein the first piece includes at least one spar interface for bonding to a surface, wherein the at least one spar interface includes at least one of an aft spar interface and a forward spar interface.

4. The rib structure of claim 1, wherein the second piece includes at least one skin interface comprising at least one of an upper skin interface and a lower skin interface, the at least one skin interface configured to be bonded to a surface.

5. The rib structure of claim 1, wherein the first piece and the second piece include a coincident hole defined through the first and the second pieces.

6. The rib structure of claim 1, wherein the first piece includes an undulating pattern that includes a plurality of rectangular pieces and the plurality of discontinuous flanges, which are in substantially similar planes.

7. The rib structure of claim 1, wherein the second piece further comprises a plurality of discontinuous flanges on at least one of opposite first and second edges thereof, wherein the plurality of discontinuous flanges of the first piece extend in a first direction and the plurality of discontinuous flanges of the second piece extend in a second direction opposite the first direction.

8. The rib structure of claim 1, wherein the first piece comprises the plurality of discontinuous flanges are on both the first and second edges thereof.

9. The rib structure of claim 1, wherein the second curvature comprises a second plurality of ribs on a front surface of the second piece and extending between opposite first and second edges of the second piece.

10. The rib structure of claim 9, wherein the plurality of discontinuous flanges comprises a first plurality of discontinuous flanges and wherein the second piece further comprises a second plurality of discontinuous flanges on at least one of the first and second edges thereof, the second plurality of discontinuous flanges extending perpendicular to the front surface of the second piece.

11. A method for creating a rib structure, comprising:
 forming from a first single continuous piece of material a first piece comprising a first curvature in a first plane, wherein the first curvature comprises a plurality of ribs on a front surface of the first piece and extending between opposite first and second edges of the first piece;
 forming along at least one of the first and second edges of the first piece a plurality of discontinuous flanges extending perpendicular to the front surface of the first piece;
 forming from a second continuous piece of material a second piece comprising a second curvature in a second plane that is different from the first plane; and
 bonding rear surfaces of the first piece and the second piece together to form the rib structure.

12. The method of claim 11, wherein the forming the first piece comprises folding at least a portion of the first piece to form one or more corrugations comprising the plurality of ribs.

13. The method of claim 11, further comprising:
 folding at least a portion of the first piece to form one or more spar interfaces.

14. The method of claim 11, wherein the first curvature includes an upper skin interface to be bonded with a surface.

15. The method of claim 11, wherein the second curvature includes a lower skin interface to be bonded with a surface.

16. An aircraft panel, comprising:
 a rib structure that further comprises:
  a first piece comprising a first single continuous piece of material and having a first curvature in a first plane, wherein the first curvature comprises a first plurality of ribs extending from a first surface of the first piece; and
  a second piece comprising a second continuous piece of material and comprising a second curvature in a second plane that is different from the first plane, wherein the second curvature comprises at least one second rib extending from a first surface of the second piece, and
 wherein a second surface of the first piece opposite the first surface of the first piece and a second surface of the second piece opposite the first surface of the second piece are bonded together to form the rib structure such that lengths of the first plurality of ribs are substantially perpendicular to a length of the at least one second rib.

17. The aircraft panel of claim 16, wherein the first piece further comprises a plurality of discontinuous flanges configured to interface with a plurality of skin surfaces of an aircraft.

18. The aircraft panel of claim 16, wherein the first piece includes an aft spar interface configured to be bonded to a surface of an aircraft.

19. The aircraft panel of claim 16, wherein the second piece includes an upper skin interface configured to be bonded to a first surface of the aircraft, and wherein the second piece includes a lower skin interface configured to be bonded to a second surface of the aircraft.

20. The aircraft panel of claim 16, wherein the first piece includes an undulating pattern that includes rectangular pieces and a plurality of discontinuous flanges that are in substantially similar planes.

\* \* \* \* \*